(12) United States Patent
Byrne et al.

(10) Patent No.: US 10,670,176 B2
(45) Date of Patent: Jun. 2, 2020

(54) MANIFOLD AND METHODS OF MANUFACTURING SAME

(71) Applicant: S.P.M. Flow Control, Inc., Fort Worth, TX (US)

(72) Inventors: Joseph H. Byrne, Hudson Oaks, TX (US); Frank Murtland, Fort Worth, TX (US); Ed Kotapish, Willow Park, TX (US)

(73) Assignee: S.P.M. Flow Control, Inc., Fort Worth, TX (US)

( * ) Notice: Subject to any disclaimer, the term of this patent is extended or adjusted under 35 U.S.C. 154(b) by 80 days.

(21) Appl. No.: 15/226,486

(22) Filed: Aug. 2, 2016

(65) Prior Publication Data
US 2016/0341347 A1 Nov. 24, 2016

Related U.S. Application Data

(63) Continuation of application No. 13/749,025, filed on Jan. 24, 2013, now Pat. No. 9,441,776.
(Continued)

(51) Int. Cl.
*F16L 41/02* (2006.01)
*F04B 11/00* (2006.01)
(Continued)

(52) U.S. Cl.
CPC .......... *F16L 41/02* (2013.01); *F04B 11/0008* (2013.01); *F04B 11/0016* (2013.01);
(Continued)

(58) Field of Classification Search
CPC ......... F16L 41/02; F16L 41/026; F04B 53/16; F04B 15/02; F04B 53/001; F04B 11/0016; F04B 11/0008
See application file for complete search history.

(56) References Cited

U.S. PATENT DOCUMENTS 2,125,703 A * 8/1938 Williams ............... F01N 13/102
165/154
2,423,574 A * 7/1947 Barrett .................... F01N 3/046
138/37
(Continued)

FOREIGN PATENT DOCUMENTS

CN    2198487 Y    5/1995
CN    1560420 A    1/2005
(Continued)

OTHER PUBLICATIONS

"International Search Report and Written Opinion for PCT/US2016/038474, dated Oct. 5, 2016, 9 pages."
(Continued)

*Primary Examiner* — Angelisa L. Hicks
(74) *Attorney, Agent, or Firm* — Foley & Lardner LLP

(57) ABSTRACT

According to one aspect, a manifold defines an internal region and a first inside surface. A fluid liner is permanently bonded to the first inside surface, and dynamically responds to pressure fluctuations within the internal region during fluid flow therethrough while the permanent bond is maintained. According to another aspect, an end cap is connected to the elongated member and defines a second inside surface. The fluid liner is engaged with each of first and second inside surfaces, and defines a third inside surface. A first thickness of the fluid liner is defined between the first and third inside surfaces, a second thickness of the fluid liner is defined between the second and third inside surfaces, and the second thickness is greater than the first thickness. According to another aspect, a plug opening is formed through the fluid liner, and a liner plug extends within the plug opening.

8 Claims, 19 Drawing Sheets

Related U.S. Application Data

(60) Provisional application No. 61/590,657, filed on Jan. 25, 2012, provisional application No. 61/645,407, filed on May 10, 2012, provisional application No. 61/650,223, filed on May 22, 2012.

(51) Int. Cl.
*F04B 15/02* (2006.01)
*F04B 53/00* (2006.01)

(52) U.S. Cl.
CPC ............ *F04B 15/02* (2013.01); *F04B 53/001* (2013.01); *Y10T 137/0402* (2015.04); *Y10T 137/85938* (2015.04)

(56) References Cited

U.S. PATENT DOCUMENTS

| | | | |
|---|---|---|---|
| 2,873,227 | A | 2/1959 | Olson et al. |
| 3,373,695 | A | 3/1968 | Yohpe |
| 3,394,761 | A | 7/1968 | Jackson, Jr. et al. |
| 3,437,467 | A | 4/1969 | Jacobus |
| 3,799,196 | A | 3/1974 | Scheitlin et al. |
| 4,179,884 | A * | 12/1979 | Koeslin ................ F01N 3/046 29/455.1 |
| 4,349,403 | A | 9/1982 | Blenner et al. |
| 4,712,578 | A | 12/1987 | White |
| 4,886,009 | A | 12/1989 | Gondar et al. |
| 4,922,958 | A | 5/1990 | Lemp |
| 5,823,093 | A | 10/1998 | Kugelev et al. |
| 5,860,452 | A | 1/1999 | Ellis |
| 5,950,575 | A | 9/1999 | Simons |
| 6,056,014 | A * | 5/2000 | Kojima ................ F16L 41/02 138/37 |
| 6,062,308 | A * | 5/2000 | Flood ................ E21B 36/00 137/602 |
| 6,089,837 | A | 7/2000 | Cornell |
| 6,109,304 | A | 8/2000 | Wolf |
| 6,626,152 | B1 * | 9/2003 | Deangelis ............ F02M 69/465 123/456 |
| 6,651,698 | B1 | 11/2003 | Wilkes |
| 7,252,071 | B2 | 8/2007 | Kochanowski et al. |
| 7,278,837 | B2 | 10/2007 | Malmberg |
| 7,354,256 | B1 | 4/2008 | Cummins |
| 7,509,927 | B2 * | 3/2009 | Mukomilow ......... F24D 3/1066 122/235.15 |
| 7,524,173 | B2 | 4/2009 | Cummins |
| 7,621,728 | B2 | 11/2009 | Miller |
| 8,105,055 | B2 | 1/2012 | Small |
| 8,444,398 | B2 | 5/2013 | Brunet et al. |
| 8,899,940 | B2 | 12/2014 | Leugemors et al. |
| 9,441,776 | B2 | 9/2016 | Byrne et al. |
| 2002/0108660 | A1 | 8/2002 | Braun et al. |
| 2005/0188956 | A1 * | 9/2005 | Moschini ......... F02M 35/10085 123/456 |
| 2005/0248334 | A1 | 11/2005 | Dagenais et al. |
| 2005/0276708 | A1 | 12/2005 | Miller |
| 2006/0123616 | A1 * | 6/2006 | Aday ................ F04B 15/02 29/446 |
| 2006/0225705 | A1 * | 10/2006 | Kochanowski ...... F02M 55/025 123/456 |
| 2008/0276998 | A1 | 11/2008 | Boyher et al. |
| 2010/0068508 | A1 | 3/2010 | Shinde et al. |
| 2011/0110793 | A1 | 5/2011 | Leugemors |
| 2012/0024413 | A1 | 2/2012 | Yang et al. |
| 2013/0071256 | A1 | 3/2013 | Kent |
| 2014/0137963 | A1 | 5/2014 | Blume |
| 2014/0251486 | A1 | 9/2014 | Gunsing |
| 2015/0300332 | A1 | 10/2015 | Kotapish et al. |
| 2016/0369926 | A1 | 12/2016 | Shuck |

FOREIGN PATENT DOCUMENTS

| | | |
|---|---|---|
| CN | 201036734 Y | 3/2008 |
| CN | 101680589 A | 3/2010 |
| CN | 201696751 U | 1/2011 |
| CN | 201753815 | 3/2011 |
| GB | 968347 | 9/1964 |

OTHER PUBLICATIONS

Extended European Search Report dated Nov. 15, 2013 re Application No. 13741018.9 (8 pages).

Office Action dated Mar. 30, 2015 in U.S. Appl. No. 13/749,025, USPTO (7 pages).

Office Action dated Aug. 31, 2015 in U.S. Appl. No. 13/749,025, USPTO (21 pages).

Office Action dated Feb. 11, 2016 in U.S. Appl. No. 13/749,025, USPTO (21 pages).

Notice of Allowance dated May 3, 2016 in U.S. Appl. No. 13/749,025, USPTO (8 pages).

First Office Action issued by the State Intellectual Property Office of the People's Republic of China for related Chinese Application No. 201610887840.3 dated Jul. 20, 2018, 14 pages.

Examination Report issued by the Canadian Patent Office regarding related Canadian Application No. 2,862,635, dated Sep. 17, 2018, 3 pages.

Canadian Office Action dated Sep. 11, 2019 for Canadian Patent Application No. 2,862,635, 6 pages.

\* cited by examiner

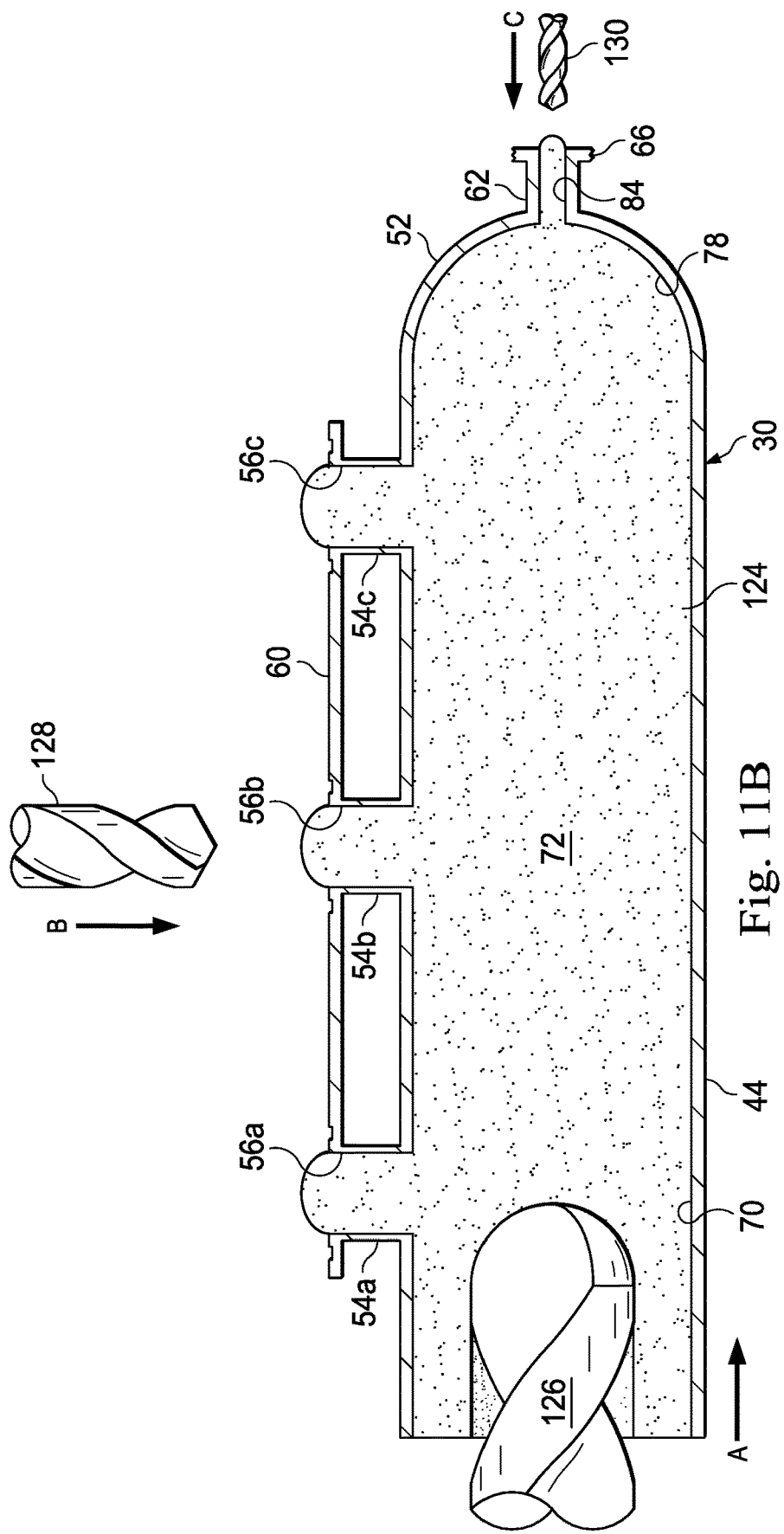

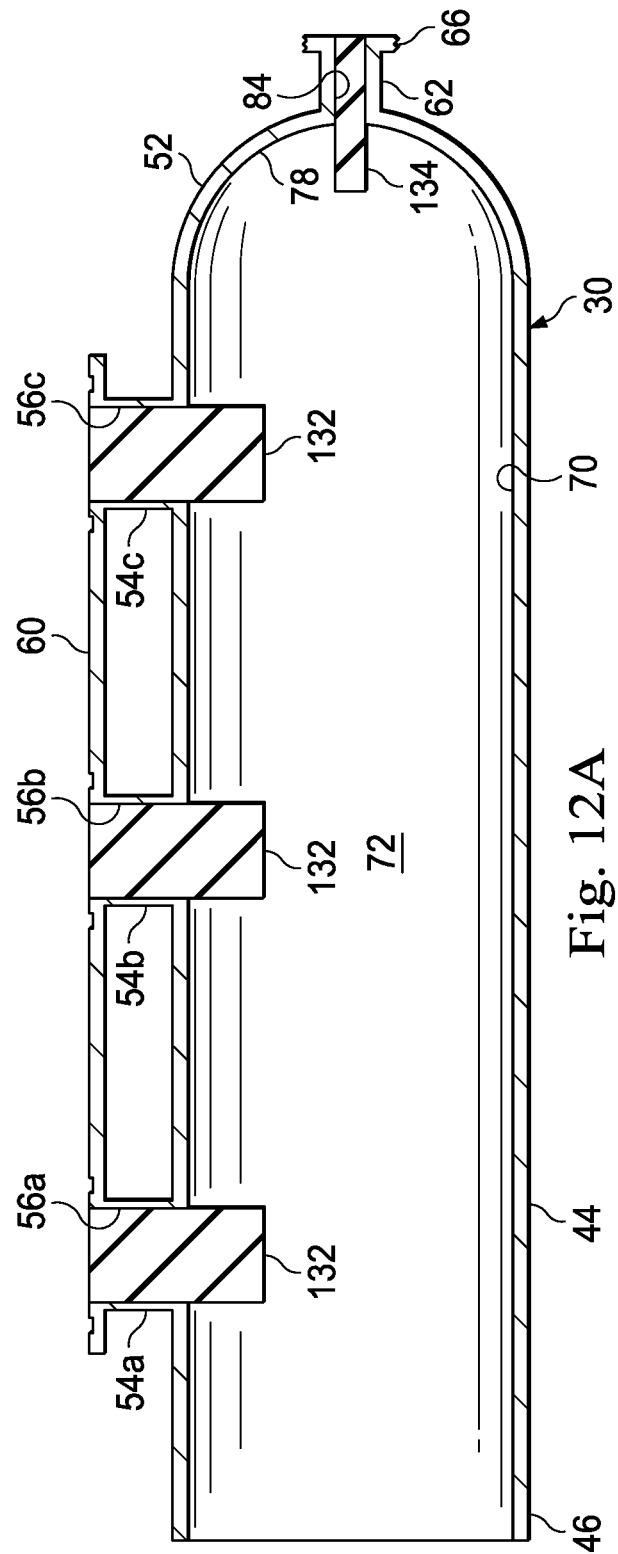

MANIFOLD AND METHODS OF MANUFACTURING SAME

CROSS-REFERENCE TO RELATED APPLICATIONS

This application is a continuation of U.S. patent application Ser. No. 13/749,025, filed Jan. 24, 2013, the entire disclosure of which is incorporated herein by reference.

This application claims the benefit of the filing date of U.S. patent application No. 61/590,657, filed Jan. 25, 2012, the entire disclosure of which is incorporated herein by reference.

This application claims the benefit of the filing date of U.S. patent application No. 61/645,407, filed May 10, 2012, the entire disclosure of which is incorporated herein by reference.

This application claims the benefit of the filing date of U.S. patent application No. 61/650,223, filed May 22, 2012, the entire disclosure of which is incorporated herein by reference.

TECHNICAL FIELD

This disclosure relates in general to manifolds and, in particular, to improved manifolds for pumps such as, for example, reciprocating pumps, and to methods of manufacturing such manifolds.

BACKGROUND OF THE DISCLOSURE

A manifold may supply fluid to a pump such as, for example, a reciprocating pump, and may distribute the fluid to different pressures chambers within the pump. In some cases, pressure fluctuations occur within the manifold, causing an uneven distribution of fluid flow within the pump, as well as excessive wear and tear on components of the pump. Additionally, if the fluid contains entrained solid particulates, such as when the fluid is drilling fluid or mud, an excessive amount of the entrained solid particulates may collect or accumulate in the manifold, contributing to the uneven distribution of fluid flow within the pump, and wear and tear on the pump components. Therefore, what is needed is an apparatus, manifold or method that addresses one or more of the foregoing issues, among others.

SUMMARY

In a first aspect, there is provided a manifold through which fluid is adapted to flow, the manifold includes an elongated member at least partially defining an internal region through which the fluid is adapted to flow, a longitudinal axis, and a first inside surface, the elongated member includes one or more inlets via which the fluid flows into the internal region; and one or more outlets via which the fluid flows out of the internal region; and a fluid liner disposed within the internal region and permanently bonded to the first inside surface of the elongated member, wherein the fluid liner dynamically responds to pressure fluctuations within the internal region during fluid flow therethrough while the permanent bond between the fluid liner and the first inside surface of the elongated member is maintained.

In an exemplary embodiment, the one or more outlets of the elongated member include two outlets; wherein the manifold further includes two radially-extending openings formed through the fluid liner and generally aligned with the two outlets, respectively; and wherein the two radially-extending openings are axially spaced from each other so that a portion of the fluid liner extends axially between the two radially-extending openings.

In certain exemplary embodiments, the manifold includes two tubes axially spaced from each other and extending from the elongated member, the two tubes defining two fluid passages, respectively; wherein the two fluid passages are generally aligned with the two outlets, respectively, and thus with the two radially-extending openings, respectively, so that each of the two fluid passages are in fluid communication with the internal region.

In another exemplary embodiment, the manifold includes two helical vanes disposed in the two fluid passages, respectively; wherein the two helical vanes are adapted to induce vortices in fluid flow through the two fluid passages, respectively.

In certain exemplary embodiments, the manifold includes a first plug opening formed through the fluid liner; and a first liner plug extending within the first plug opening.

In an exemplary embodiment, the first liner plug dynamically responds to pressure fluctuations within the internal region during fluid flow therethrough.

In another exemplary embodiment, the manifold includes a first stem extending from the elongated member; and first bull plug assembly connected to the first stem, the first plug assembly includes the first liner plug; and a first head from which the first liner plug extends.

In yet another exemplary embodiment, the first plug assembly further includes a first post extending from the head and into the first liner plug.

In an exemplary embodiment, the manifold includes a second plug opening formed through the fluid liner and axially spaced from the first plug opening so that a portion of the fluid liner extends axially between the first and second plug openings; and a second liner plug extending within the second plug opening.

In another exemplary embodiment, the fluid liner is formed of a resilient material that includes a nitrile rubber material; and wherein the fluid liner is permanently bonded to the first inside surface using at least a vulcanizable adhesive compound.

In yet another exemplary embodiment, the manifold includes an end cap connected to the elongated member, the end cap defining a second inside surface to which the fluid liner is permanently bonded; wherein the fluid liner defines a third inside surface within the internal region.

In an exemplary embodiment, a first thickness of the fluid liner is defined between the first inside surface of the elongated member and the third inside surface of the fluid liner; wherein a second thickness of the fluid liner is defined between the second inside surface of the end cap and the third inside surface of the fluid liner; and wherein the second thickness of the fluid liner is greater than the first thickness of the fluid liner.

In another exemplary embodiment, the portion of the fluid liner permanently bonded to the first inside surface of the elongated member has a longitudinally-extending taper, the longitudinally-extending taper defining a taper angle between the longitudinal axis and the third inside surface, the taper angle ranging from greater than 0 degrees to less than about 70 degrees measured from the longitudinal axis.

In yet another exemplary embodiment, the manifold is adapted to be connected to a fluid cylinder of a reciprocating pump.

In a second aspect, there is provided a manifold through which fluid is adapted to flow, the manifold includes an elongated member, the elongated member defining a longitudinal axis and a first inside surface; an end cap connected to the elongated member, the end cap defining a second inside surface; an internal region at least partially defined by the elongated member and the end cap; and a fluid liner disposed within the internal region and engaged with each of first and second inside surfaces, the fluid liner defining a third inside surface within the internal region; wherein the fluid liner dynamically responds to pressure fluctuations within the internal region during fluid flow therethrough; wherein a first thickness of the fluid liner is defined between the first inside surface of the elongated member and the third inside surface of the fluid liner; wherein a second thickness of the fluid liner is defined between the second inside surface of the end cap and the third inside surface of the fluid liner; and wherein the second thickness of the fluid liner is greater than the first thickness of the fluid liner.

In an exemplary embodiment, the fluid liner is permanently bonded to each of the first and second inside surfaces; and wherein the fluid liner dynamically responds to pressure fluctuations within the internal region during fluid flow therethrough while the permanent bond between the fluid liner and each of the first and second inside surfaces is maintained.

In another exemplary embodiment, the portion of the fluid liner engaged with the first inside surface has a longitudinally-extending taper, the longitudinally-extending taper defining a taper angle between the longitudinal axis and the third inside surface, the taper angle ranging from greater than 0 degrees to less than about 70 degrees measured from the longitudinal axis.

In yet another exemplary embodiment, the elongated member include two outlets; wherein the manifold further includes two radially-extending openings formed through the fluid liner and generally aligned with the two outlets, respectively; and wherein the two radially-extending openings are axially spaced from each other so that a portion of the fluid liner extends axially between the two radially-extending openings.

In an exemplary embodiment, the manifold includes two tubes axially spaced from each other and extending from the elongated member, the two tubes defining two fluid passages, respectively, wherein the two fluid passages are generally aligned with the two outlets, respectively, and thus with the two radially-extending openings, respectively, so that each of the two fluid passages are in fluid communication with the internal region; and two helical vanes disposed in the two fluid passages, respectively.

In another exemplary embodiment, the manifold includes a first plug opening formed through the fluid liner; a first stem extending from the elongated member; and a first bull plug assembly connected to the first stem, the first bull plug assembly includes a head; a first liner plug extending from the head and within the first plug opening; and a first post extending from the head and into the first liner plug; wherein the first liner plug dynamically responds to pressure fluctuations within the internal region during fluid flow therethrough.

In a third aspect, there is provided a manifold through which fluid is adapted to flow, the manifold includes an elongated member, the elongated member defining a longitudinal axis and a first inside surface; an internal region at least partially defined by the elongated member; a fluid liner disposed within the internal region and engaged with the first inside surface of the elongated member; a first plug opening formed through the fluid liner; a first stem extending from the elongated member; and a first bull plug assembly connected to the first stem, the first bull plug assembly includes a first liner plug extending within the first plug opening; wherein each of the fluid liner and the first liner plug dynamically responds to pressure fluctuations within the internal region during fluid flow therethrough.

In an exemplary embodiment, the manifold includes an end cap connected to the elongated member, the end cap defining a second inside surface; wherein the internal region is at least partially defined by the elongated member and the end cap; wherein the fluid liner is engaged with the second inside surface of the end cap; wherein the fluid liner defines a third inside surface within the internal region; wherein a first thickness of the fluid liner is defined between the first inside surface of the elongated member and the third inside surface of the fluid liner; wherein a second thickness of the fluid liner is defined between the second inside surface of the end cap and the third inside surface of the fluid liner; and wherein the second thickness of the fluid liner is greater than the first thickness of the fluid liner.

In another exemplary embodiment, the fluid liner is permanently bonded to each of the first and second inside surfaces; and wherein the fluid liner dynamically responds to pressure fluctuations within the internal region during fluid flow therethrough while the permanent bond between the fluid liner and each of the first and second inside surfaces is maintained.

In yet another exemplary embodiment, the elongated member include two outlets; wherein the manifold further includes two radially-extending openings formed through the fluid liner and generally aligned with the two outlets, respectively; and wherein the two radially-extending openings are axially spaced from each other so that a portion of the fluid liner extends axially between the two radially-extending openings.

In an exemplary embodiment, the manifold includes two tubes axially spaced from each other and extending from the elongated member, the two tubes defining two fluid passages, respectively, wherein the two fluid passages are generally aligned with the two outlets, respectively, and thus with the two radially-extending openings, respectively, so that each of the two fluid passages are in fluid communication with the internal region; and two helical vanes disposed in the two fluid passages, respectively.

In another exemplary embodiment, the first bull plug assembly further includes a first head from which the first liner plug extends; and a first post extending from the head and into the first liner plug.

In a fourth aspect, there is provided a method of manufacturing a manifold through which fluid is adapted to flow, the method includes providing an elongated member, the elongated member at least partially defining an internal region through which the fluid is adapted to flow, a longitudinal axis, and a first inside surface, the elongated member includes one or more inlets via which the fluid is adapted to flow into the internal region, and one or more outlets via which the fluid is adapted to flow out of the internal region; disposing a fluid liner within the internal region; and permanently bonding the fluid liner to the first inside surface of the elongated member; wherein the fluid liner is adapted to dynamically respond to pressure fluctuations within the internal region during fluid flow therethrough while the permanent bond between the fluid liner and the first inside surface of the elongated member is maintained.

In an exemplary embodiment, disposing the fluid liner within the internal region includes disposing one or more materials within the internal region; and forming the fluid liner from the one or more materials disposed within the internal region.

In another exemplary embodiment, the fluid liner is permanently bonded to the first inside surface during, after, or during and after, the fluid liner is formed from the material disposed within the internal region.

In yet another exemplary embodiment, the one or more outlets of the elongated member include two outlets; and wherein the method further includes forming two radially-extending openings through the fluid liner so that the two radially-extending openings are generally aligned with the two outlets, respectively; and the two radially-extending openings are axially spaced from each other so that a portion of the fluid liner extends axially between the two radially-extending openings.

In an exemplary embodiment, the method includes extending two axially-spaced tubes from the elongated member, the two tubes defining two fluid passages, respectively; wherein the two fluid passages are generally aligned with the two radially-extending openings, respectively.

In another exemplary embodiment, the method includes disposing two helical vanes in the two fluid passages, respectively; wherein the two helical vanes are adapted to induce vortices in fluid flow through the two fluid passages, respectively.

In yet another exemplary embodiment, the method includes forming a first plug opening through the fluid liner; and extending a first liner plug within the first plug opening.

In an exemplary embodiment, the first liner plug is adapted to dynamically respond to pressure fluctuations within the internal region during fluid flow therethrough.

In another exemplary embodiment, the method includes extending a first stem from the elongated member; and connecting a first bull plug assembly to the first stem, the first plug assembly includes the first liner plug and a first head from which the first liner plug extends; wherein the first liner plug extends within the first plug opening in response to connecting the first bull plug assembly to the first stem.

In yet another exemplary embodiment, the first plug assembly further includes a first post extending from the head and into the first liner plug.

In an exemplary embodiment, the method includes forming a second plug opening through the fluid liner so that the second plug opening is axially spaced from the first plug opening, and a portion of the fluid liner extends axially between the first and second plug openings; and extending a second liner plug within the second plug opening.

In another exemplary embodiment, the fluid liner includes a nitrile rubber material; and wherein the fluid liner is permanently bonded to the first inside surface using at least a vulcanizable adhesive compound.

In yet another exemplary embodiment, the method includes connecting an end cap to the elongated member, the end cap defining a second inside surface; and permanently bonding the fluid liner to the second inside surface of the end cap; wherein the fluid liner defines a third inside surface within the internal region.

In an exemplary embodiment, the fluid liner is formed so that a first thickness of the fluid liner is defined between the first inside surface of the elongated member and the third inside surface of the fluid liner; a second thickness of the fluid liner is defined between the second inside surface of the end cap and the third inside surface of the fluid liner; and the second thickness of the fluid liner is greater than the first thickness of the fluid liner.

In another exemplary embodiment, the fluid liner is formed so that the portion of the fluid liner permanently bonded to the first inside surface of the elongated member has a longitudinally-extending taper, the longitudinally-extending taper defining a taper angle between the longitudinal axis and the third inside surface, the taper angle ranging from greater than 0 degrees to less than about 70 degrees measured from the longitudinal axis.

In yet another exemplary embodiment, the manifold is adapted to be connected to a fluid cylinder of a reciprocating pump.

In a fifth aspect, there is provided a manifold through which fluid is adapted to flow, the fluid containing entrained solid particulates, the manifold includes an elongated member defining a longitudinal axis and a first inside surface, the elongated member includes a first outlet; an internal region at least partially defined by the elongated member; a fluid liner disposed within the internal region and engaged with the first inside surface of the elongated member, wherein the fluid liner dynamically responds to pressure fluctuations within the internal region during fluid flow therethrough; a first tube extending from the elongated member, the first tube defining a first fluid passage in fluid communication with the internal region via the first outlet; and a first helical vane disposed in the first fluid passage to urge the entrained solid particulates to flow through the first fluid passage.

In an exemplary embodiment, the elongated member includes a second outlet; and wherein the manifold further includes first and second radially-extending openings formed through the fluid liner and generally aligned with the first and second outlets, respectively; and wherein the first and second radially-extending openings are axially spaced from each other so that a portion of the fluid liner extends axially between the two radially-extending openings.

In another exemplary embodiment, the manifold includes a second tube extending from the elongated member, the second tube defining a second fluid passage in fluid communication with the internal region via the second outlet and the second radially-extending opening; and a second helical vane disposed in the second fluid passage to urge the entrained solid particulates to flow through the second fluid passage.

In yet another exemplary embodiment, the manifold includes a first plug opening formed through the fluid liner; a first stem extending from the elongated member; and a first bull plug assembly connected to the first stem, the first bull plug assembly includes a first liner plug extending within the first plug opening; wherein the first liner plug dynamically responds to pressure fluctuations within the internal region during fluid flow therethrough.

In an exemplary embodiment, the first bull plug assembly further includes a first head from which the first liner plug extends; and a first post extending from the head and into the first liner plug.

In another exemplary embodiment, the manifold includes an end cap connected to the elongated member, the end cap defining a second inside surface; wherein the internal region is at least partially defined by the elongated member and the end cap; wherein the fluid liner is engaged with the second inside surface of the end cap; wherein the fluid liner defines a third inside surface within the internal region; wherein a first thickness of the fluid liner is defined between the first inside surface of the elongated member and the third inside surface of the fluid liner; wherein a second thickness of the fluid liner is defined between the second inside surface of the end cap and the third inside surface of the fluid liner; and wherein the second thickness of the fluid liner is greater than the first thickness of the fluid liner.

In yet another exemplary embodiment, the fluid liner is permanently bonded to the first inside surface; and wherein the fluid liner dynamically responds to pressure fluctuations within the internal region during fluid flow therethrough while the permanent bond between the fluid liner and the first inside surface is maintained.

Other aspects, features, and advantages will become apparent from the following detailed description when taken in conjunction with the accompanying drawings, which are a part of this disclosure and which illustrate, by way of example, principles of the inventions disclosed.

DESCRIPTION OF FIGURES

The accompanying drawings facilitate an understanding of the various embodiments.

FIGS. 10, 11A and 11B are sectional and partial sectional/partial diagrammatic views of a portion of the manifold of FIGS. 1-4B during the manufacture thereof, according to still yet another exemplary embodiment.

FIGS. 12A and 12B are sectional and partial sectional/partial diagrammatic views of a portion of the manifold of FIGS. 1-4B during the manufacture thereof, according to still yet another exemplary embodiment.

DETAILED DESCRIPTION

Figure 1:
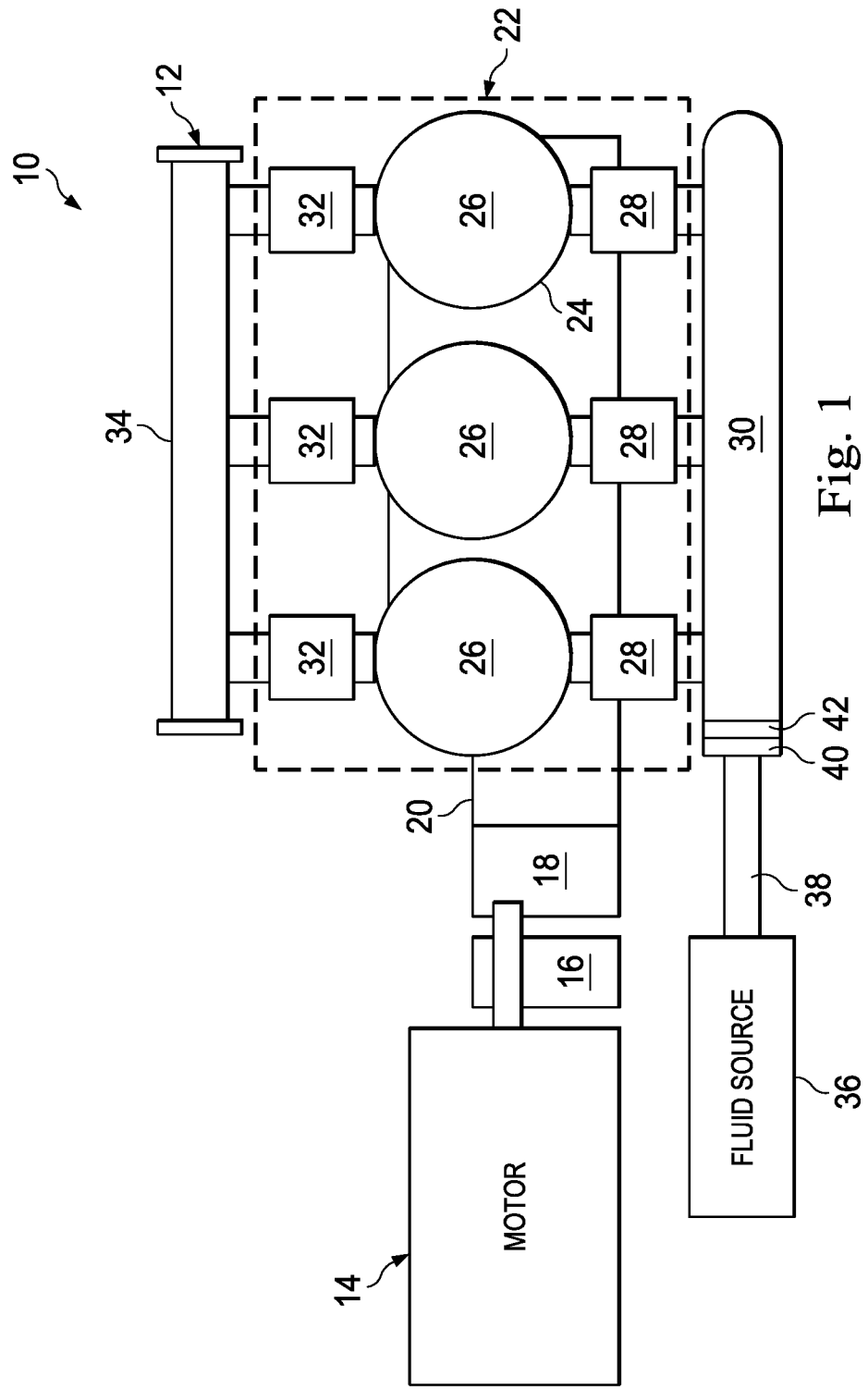
FIG. 1 is a diagrammatic illustration of an apparatus according to an exemplary embodiment, the apparatus includes a manifold.
Figure 2:
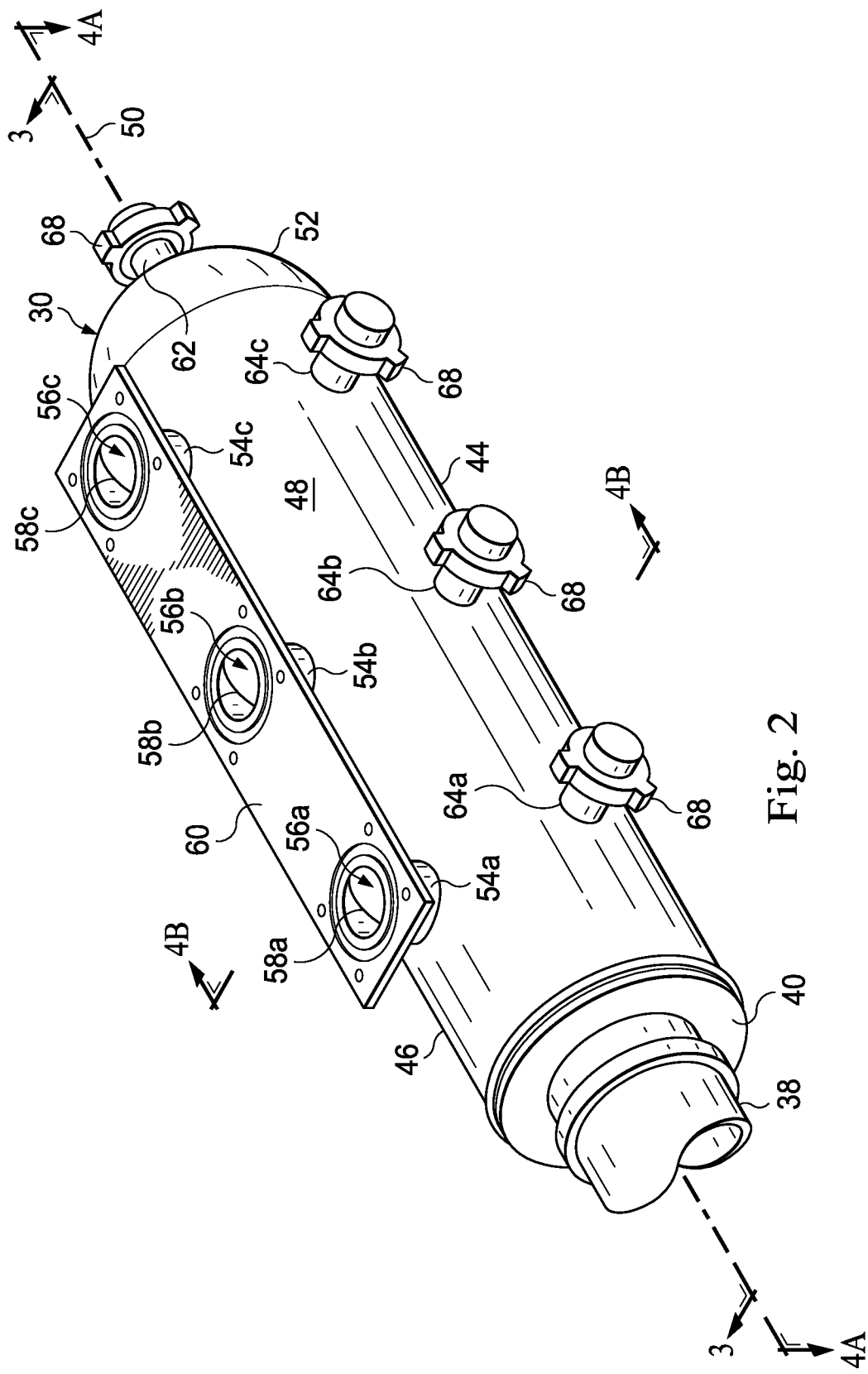
FIG. 2 is a perspective view of the manifold of FIG. 1, according to an exemplary embodiment.

In an exemplary embodiment, as illustrated in FIG. 1, an apparatus is generally referred to by the reference numeral 10 and includes a reciprocating pump assembly 12 and a motor 14 operably coupled thereto. The motor 14 is adapted to drive the pump assembly 12 via a transmission or coupling 16 and a speed reduction drive mechanism 18. The pump assembly 12 includes a power end portion 20 and a fluid end portion 22 operably coupled thereto. The speed reduction drive mechanism 18 is operably coupled to the power end portion 20. The fluid end portion 22 includes a fluid end block or fluid cylinder 24 in which a plurality of pressure chambers 26 are formed. During operation, the power end portion 20 is adapted to cause respective plungers (not shown) to reciprocate in and out of the pressure chambers 26. The combination of at least each pressure chamber 26 and corresponding plunger may be characterized as a plunger throw. In several exemplary embodiments, the pump assembly 12 includes three plunger throws (i.e., a triplex pump as shown in FIG. 1), or includes four, five or more plunger throws. In an exemplary embodiment, the pump assembly 12 is a mud pump, or a hydraulic facturing (or "frac") pump.

As shown in FIG. 1, respective inlet valve housings 28 are in fluid communication with the pressure chambers 26. The inlet valve housings 28 are also in fluid communication with an inlet, or suction, manifold 30. Each of the inlet valve housings 28 includes a valve (not shown) disposed therein that selectively permits fluid to flow from the suction manifold 30 and into the corresponding pressure chamber 26. Respective outlet valve housings 32 are in fluid communication with the pressure chambers 26. The outlet valve housings 32 are also in fluid communication with an outlet, or discharge, manifold 34. Each of the outlet valve housings 32 includes a valve (not shown) disposed therein that selectively permits fluid to flow out of the corresponding pressure chamber 26 and into the discharge manifold 34. A source of fluid 36 is in fluid communication with the suction manifold 30 via a fluid conduit 38. The suction manifold 30 is connected to the conduit 38 via a flanged connection, with a flange 40 at the end of the conduit 38 being connected to an end plate 42 of the suction manifold 30.

In an exemplary embodiment, as illustrated in FIGS. 2, 3, 4A and 4B with continuing reference to FIG. 1, the suction manifold 30 includes an elongated member 44 that is generally cylindrical and includes opposing end portions 46 and 48. A longitudinal axis 50 is defined by the elongated member 44. The end plate 42 is connected to the elongated member 44 at the end portion 46, and an end cap 52 is connected to the elongated member 44 at the end portion 48. Axially-spaced tubes 54a, 54b and 54c extend from the elongated member 44 in a direction that is perpendicular to the longitudinal axis 50. The tubes 54a, 54b and 54c define fluid passages 56a, 56b and 56c, respectively.

Helical vanes 58a, 58b and 58c are disposed within the fluid passages 56a, 56b and 56c, respectively, and are connected to the tubes 54a, 54b and 54c, respectively. Under conditions to be described below, each of the helical vanes 58a, 58b and 58c is adapted to induce a vortex in fluid flowing through the corresponding fluid passage 56a, 56b or 56c, thereby reducing turbulence and creating a more laminar flow in the fluid end portion 22 of the pump assembly 12. In several exemplary embodiments, the helical vanes 58a, 58b and 58c may be integrally cast with, and/or welded to, the tubes 54a, 54b and 54c, respectively. In an exemplary embodiment, each of the helical vanes 58a, 58b and 58c may be a collapsible insert mounted into the side of the corresponding tube 54a, 54b or 54c.

The tubes 54a, 54b and 54c extend to a manifold flange 60, which may be connected to the respective inlet valve housings 28, shown in FIG. 1. In an exemplary embodiment, instead of the inlet valve housings 28, the manifold flange 60 may be connected to another portion of the fluid end 22.

A cleanout stem 62 extends from the end cap 52 and along the longitudinal axis 50. Valve lift stems 64a, 64b and 64c extend from the elongated member 44 in a direction that is perpendicular to each of the longitudinal axis 50 and the direction of extension of the tubes 54a, 54b and 54c. Each of the cleanout stem 62 and the valve lift stems 64a, 64b and 64c includes an external threaded connection 66 (shown in FIGS. 3 and 4A) at the distal end portion thereof. Respective bull plug assemblies 68 are connected to each of the cleanout stem 62 and the valve lift stems 64a, 64b and 64c.

Figure 3:
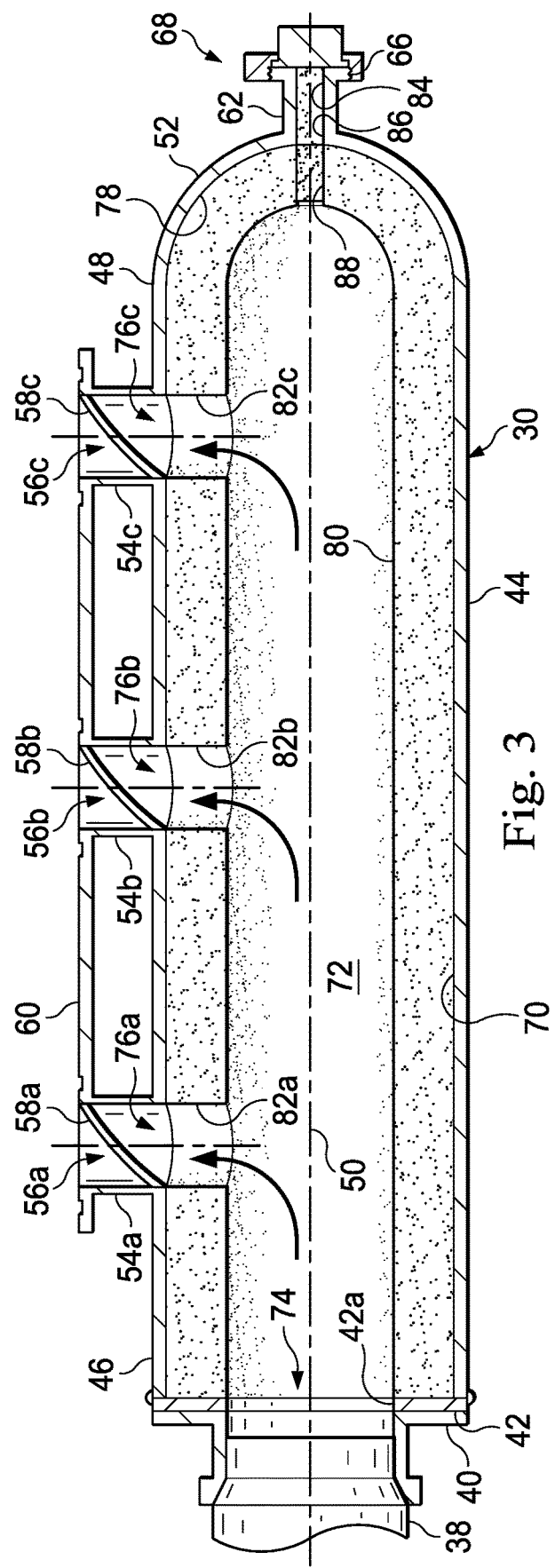
FIG. 3 is a section view taken along line 3-3 of FIG. 2, according to an exemplary embodiment.

As shown in FIG. 3, the elongated member 44 defines a generally cylindrical inside surface 70, and at least partially defines an internal region 72. The elongated member 44 includes an inlet 74 at the end portion 46, and outlets 76a, 76b and 76 formed through the wall thereof. The outlets 76a, 76b and 76c are generally aligned with the fluid passages 56a, 56b and 56c, respectively. The end plate 42 is positioned at the inlet 74, and includes a through-opening 42a. The end cap 52 defines a generally concave inside surface 78, which is adjacent the inside surface 70 and together with the inside surface 70 forms a generally continuous inside surface. The end cap 52 partially defines the internal region 72. In an exemplary embodiment, the end cap 52 and/or the inside surface 78 may not be concave or bowl-shaped, and instead the end cap 52 and/or the inside surface 78 may be, for example, flat, corrugated, convex, in the form of plate, etc.

A fluid liner 80 is disposed within the internal region 72 and permanently bonded to the inside surfaces 70 and 78. Under conditions to be described below, the fluid liner 80 dynamically responds to pressure fluctuations within the internal region 72 during fluid flow therethrough while the permanent bond between the fluid liner 80 and the inside surfaces 70 and 78 is maintained. The portion of the fluid liner 80 permanently bonded to the inside surface 70 is generally cylindrical in shape, corresponding to the general cylindrical shape of the inside surface 70. The portion of the fluid liner 80 permanently bonded to the inside surface 78 of the end cap 52 is generally bowl-shaped, corresponding to the general bowl shape of the inside surface 78.

In an exemplary embodiment, the fluid liner 80 is formed of a resilient material that includes, for example, a foaming nitrile rubber type material (also known as Buna-N, Perbunan or Nitrile Butadiene Rubber (NBR) and provided under trades names such as Nipol®, Krynac®, and Europrene®). In an exemplary embodiment, the fluid liner 80 is formed of a resilient material that includes, for example, nitrile rubber foam that includes at least one of a nitrile rubber, a conductive carbon black, and a plasticizer, or any combination of the foregoing. In several exemplary embodiments, the fluid liner 80 is formed of a resilient material that may include, for example, a foaming hydrogenated nitrile rubber (HNBR) type material, a foaming polymeric type material (e.g., polyamides, polyesters, polyolefins, polyurethane, polyethylene, polyvinyl chloride, polyisocyanurates, and mixtures thereof), a foaming epoxy type material, foaming silicone type material, a variety of other synthetic foaming type materials, and/or any combination thereof. In several exemplary embodiments, the fluid liner 80 is formed of a resilient material that includes additional foam materials and/or non-foam materials including, but not limited to, ethylene propylene diene monomer (EPDM) rubber. In an exemplary embodiment, the fluid liner 80 is formed of a resilient material that includes cells filled with an inert gas such as, but not limited to, nitrogen; in certain exemplary embodiments, such a resilient cellular material, having cells filled with an inert gas, is formed by mixing a chemical foaming agent with a base material or polymer, and/or by injecting the inert gas into the base material.

In an exemplary embodiment, the fluid liner 80 is permanently bonded to the inside surfaces 70 and 78 using a vulcanizable adhesive compound or bonding agent. In an exemplary embodiment, the fluid liner 80 may be formed of a resilient material that includes, for example, a nitrile rubber foam material (hydrogenated or otherwise), and a vulcanizable adhesive compound may be used to provide vulcanization adhesion, and thus a permanent bond, between the fluid liner 80 and the inside surfaces 70 and 78. In an exemplary embodiment, the fluid liner 80 may be formed of a resilient material that includes, for example, a nitrile rubber foam material (hydrogenated or otherwise), and an adhesive sheet may be disposed on the inside surfaces 70 and 78 and thus between the fluid liner 80 and the inside surfaces 70 and 78, thereby permanently bonding the fluid liner 80 to the inside surfaces 70 and 78; in an exemplary embodiment, such an adhesive sheet may be rolled into the form of a tube and inserted into the internal region 72 via the inlet 74. In an exemplary embodiment, the fluid liner 80 is permanently bonded to the inside surfaces 70 and 78 using Chemlok® 8560S adhesive, Chemlok® 8110 adhesive, Chemlok® 250 adhesive, or any combination thereof. In an exemplary embodiment, the fluid liner 80 is permanently bonded to the inside surfaces 70 and 78 using MP 05 adhesive, KM 16 adhesive, KM 31 adhesive, or any combination thereof, all of which adhesives are available from Kamelock, Mönchengladbach, Germany. In an exemplary embodiment, the fluid liner 80 is permanently bonded to the inside surfaces 70 and 78 using one or more of the following Loctite®-brand products or types of products: High Methyl CA—Loctite® 496™; Super Bonder® Instant Adhesive; Surface Insensitive CA; 401™ Prism® Instant Adhesive; Primer—Loctite® 401™ Prism®; Instant Adhesive, 770™ Prism® Primer; Rubber Toughened CA; 480™ Prism® Instant Adhesive; Rubber Toughened CA; 4204™ Prism® Instant Adhesive; Medium Oxime Silicone—Loctite® 5900® Flange; Sealant, Heavy Body; Two-Part No-Mix Acrylic; 330™ Depend® Adhesive; Light Curing Acrylic—Loctite® 3105™; Light Cure Adhesive; Low Acetoxy Silicone—Loctite® Superflex®; and RTV Silicone Adhesive Sealant. In an exemplary embodiment, the fluid liner 80 is permanently bonded to the inside surfaces 70 and 78 without the use of an adhesive compound or bonding agent. In an exemplary embodiment, the fluid liner 80 is formed an NBR material or an HNBR material and, as a result of the setting of such material, the material bonds directly to the elongated member 44 and the end cap 52 and thus to the inside surfaces 70 and 78. In an exemplary embodiment, the fluid liner 80 is permanently bonded to the inside surfaces 70 and 78 using an elastomer-to-metal bonding agent.

As shown in FIG. 3, radially-extending openings 82a, 82b and 82c are formed through the fluid liner 80. The openings 82a, 82b and 82c are generally aligned with the outlets 76a, 76b and 76c, respectively, and thus with the fluid passages 56a, 56b and 56c, respectively. Thus, the internal region 72 is in fluid communication with: the fluid passage 56a via the opening 82a and the outlet 76a; the fluid passage 56b via the opening 82b and the outlet 76b; and the fluid passage 56c via the opening 82c and the outlet 56c. The openings 82a, 82b and 82c are axially spaced from each other so that respective portions of the fluid liner 80 extend axially between the openings 82a and 82b, and between the openings 82b and 82c. A passage 84 is defined by the cleanout stem 62, and is axially aligned with the longitudinal axis 50. An axial opening 86 is formed through the end cap 52 and is aligned with the longitudinal axis 50 and thus the passage 84. An axially-extending plug opening 88 is formed through the fluid liner 80, and is generally aligned with the longitudinal axis 50, the opening 86 and the passage 84.

Figure 4A:
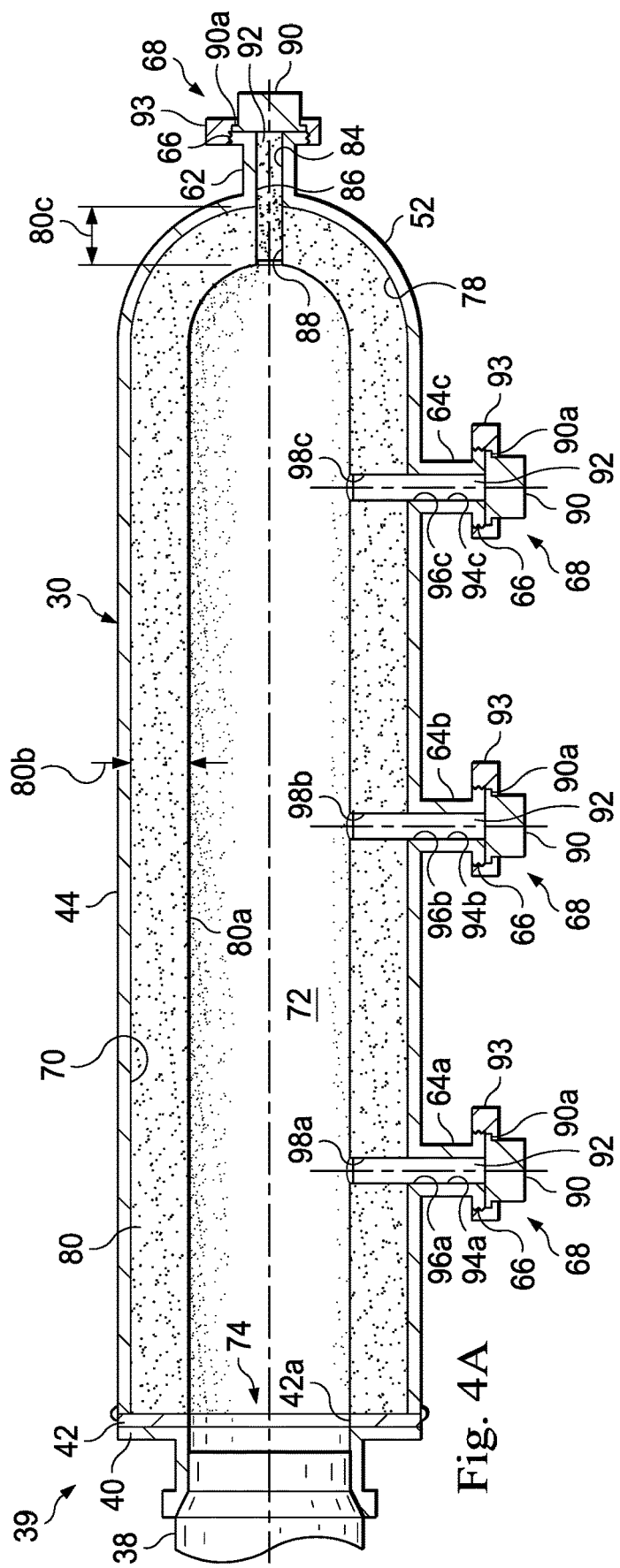
FIG. 4A is a section view taken along line 4A-4A of FIG. 2, according to an exemplary embodiment.
Figure 4B:
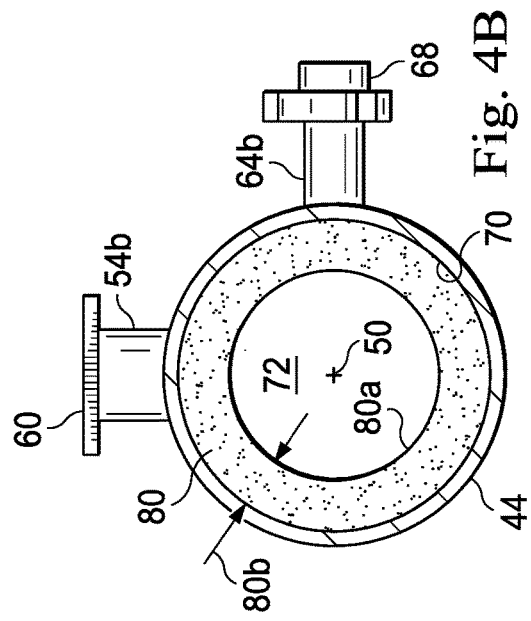
FIG. 4B is a section view taken along line 4B-4B of FIG. 2, according to an exemplary embodiment.

As shown in FIG. 4A, each bull plug assembly 68 includes a head 90 having a shoulder that defines an axially-facing surface 90*a*. A liner plug 92 extends from the head 90 in a direction opposite the direction in which the axially-facing surface 90*a* faces. A wing nut 93 including an internal threaded connection fits over the head 90, and engages the axially-facing surface 90*a*. In an exemplary embodiment, the liner plug 92 is formed of a resilient material that may be identical to, or different from, the above-described resilient material of which the fluid liner 80 is formed. In several exemplary embodiments, the liner plug 92 may be formed of a resilient material that includes one or more of the materials described or identified above in connection with the resilient material of which the fluid liner 80 may be formed. In an exemplary embodiment, the liner plug 92 is a molded cylindrical plug.

The valve lift stems 64*a*, 64*b* and 64*c* define passages 94*a*, 94*b* and 94*c*, respectively. Radial openings 96*a*, 96*b* and 96*c* are formed through the elongated member 44, and are aligned with the passages 94*a*, 94*b* and 94*c*, respectively. Radially-extending plug openings 98*a*, 98*b* and 98*c* are formed through the fluid liner 80, and are generally aligned with the radial openings 96*a*, 96*b* and 96*c*, respectively, and the passages 94*a*, 94*b* and 94*c*, respectively. The plug openings 98*a*, 98*b* and 98*c* are axially spaced from each other so that a portion of the fluid liner 80 extends axially between the plug openings 98*a* and 98*b*, and another portion of the fluid liner 80 extends axially between the plug openings 98*b* and 98*c*.

The respective heads 90 of the bull plug assemblies 68 abut the distal ends of the stems 62, 64*a*, 64*b* and 64*c*. The respective liner plugs 92 of the bull plug assemblies 68 extend through the passages 84, 94*a*, 94*b* and 94*c*, through the openings 86, 96*a*, 96*b* and 96*c*, and into the openings 88, 98*a*, 98*b* and 98*c* formed in the fluid liner 80, thereby plugging the openings 88, 98*a*, 98*b* and 98*c*. The internal threaded connections of the wing nuts 93 of the bull plug assemblies 68 threadably engage the external threaded connections 66, respectively, thereby connecting each of the bull plug assemblies 68 to either the end cap 52 or the elongated member 44. As a result, the aforementioned plugging of the openings 88, 98*a*, 98*b* and 98*c* is maintained.

An inside surface 80*a* within the internal region 72 is defined by the fluid liner 80. A thickness 80*b* of the fluid liner 80 is defined between the inside surface 70 of the elongated member 44 and the inside surface 80*a* of the fluid liner 80. A thickness 80*c* of the fluid liner 80 is defined between the inside surface 78 of the end cap 52 and the inside surface 80*a* of the fluid liner 80. In an exemplary embodiment, the thickness 80*c* is greater than the thickness 80*b*. In an exemplary embodiment, the thicknesses 80*b* and 80*c* are equal. In an exemplary embodiment, the thickness 80*c* is less than the thickness 80*b*.

In several exemplary embodiments, one or more of the end plate 42, the end cap 52, the tubes 54*a*, 54*b* and 54*c*, the cleanout stem 62, and the valve lift stems 64*a*, 64*b* and 64*c*, are integrally formed with the elongated member 44. In several exemplary embodiments, one or more of the end plate 42, the elongated member 44, the end cap 52, the tubes 54*a*, 54*b* and 54*c*, the cleanout stem 62, and the valve lift stems 64*a*, 64*b* and 64*c*, may be formed of pressure vessel steels recognized by ASME, such as ASTM A36, A105B, or the like. In several exemplary embodiments, carbon steel meeting ASME requirements may be used. In another exemplary embodiment, the elongated member 44 is a cast or molded member.

In operation, in an exemplary embodiment, with continuing reference to FIGS. 1-4B, the motor 14 drives the pump assembly 12 via the transmission or coupling 16 and the speed reduction drive mechanism 18. The operation of the pump assembly 12 causes fluid to be sucked or drawn into the suction manifold 30 from the fluid source 36, or the inlet valve 28 is opened, which allows pressurized fluid to flow into the suction manifold from fluid source 36. More particularly, the fluid flows from the fluid source 36, through the conduit 38, through the inlet 74, and into the internal region 72. The fluid flows through the internal region 72, and out of the internal region 72 via one or more of the radially-extending openings 82*a*, 82*b* and 82*c*, and thus one or more of the outlets 76*a*, 76*b* and 76*c*, respectively. The fluid flows through one or more of the fluid passages 56*a*, 56*b* and 56*c*, and subsequently flows into one or more of the pressure chambers 26 via the inlet valve housings 28, respectively. The fluid is pressurized in the pressure chambers 26, and the pressurized fluid flows to the discharge manifold 34 via the outlet valve housings 32. The unnumbered arrows shown in FIG. 3 indicate the direction of fluid flow through the internal region 72 according to one exemplary embodiment, in which the fluid flows through the radially-extending openings 82*a*, 82*b* and 82*c*, the outlets 76*a*, 76*b* and 76*c*, the fluid passages 56*a*, 56*b* and 56*c*, and into all three of the pressure chambers 26 via the inlet valve housings 28.

During the above-described operation of the apparatus 10, and thus during the flow of fluid through the suction manifold 30, pressure fluctuations occur within the internal region 72 due to, for example, sudden fluid velocity changes, sudden fluid acceleration changes, acceleration-induced parameters, pressure pulses, the respective operations of the valves disposed in the inlet valve housings 28, the pressurization of the fluid in the pressure chambers 26, the respective operations of the valves disposed in the outlet valve housings 32, operational variations of the fluid source 36, or any combination of the foregoing. The fluid liner 80 dynamically responds to the pressure fluctuations within the internal region 72 by, for example, flexing and/or undergoing compression in one or more portions thereof, while maintaining the permanent bond between the fluid liner 80 and inside surfaces 70 and 78. As a result, the fluid liner 80 changes the inlet fluid volume capacity of the pump assembly 12 in response to the pressure fluctuations within the internal region 72, while maintaining the permanent bond between the fluid liner 80 and the inside surfaces 70 and 78. By dynamically responding to the pressure fluctuations within the internal region 72, the fluid liner 80 operates to stabilize fluid velocities in the internal region 72, the radially-extending openings 82*a*, 82*b* and 82*c*, the outlets 76*a*, 76*b* and 76*c*, and the fluid passages 56*a*, 56*b* and 56*c*. The fluid liner 80 dynamically responds to the pressure fluctuations within the internal region 72 by, for example, dampening pulsations within the internal region 72 resulting from fluid flow therethrough, absorbing water-hammering effects within the suction manifold 30, reducing or attenuating vibration within the suction manifold 30, and decreasing shock waves within the suction manifold 30. The fluid liner 80 can store kinetic energy generated by the motion of the fluid therethrough by local compression of the liner 80. The kinetic energy can be released from the liner 80, which assists the fluid acceleration into pumping chamber 26. This storing and discharging of kinetic energy increases pump efficiency and reduces fluid cavitation by attenuating the pulsations and acoustical pressure waves created by accelerating and deaccelerating of the pumped fluid.

During the above-described operation of the apparatus 10, the fluid may contain slurry, mud, drilling fluid, water, other types of liquids, and/or any combination thereof. The fluid may contain entrained solid particulates such as, for example, proppant, soil, mined ore particulates, tailings, etc. The helical vanes 58a, 58b and 58c induce respective vortices in the fluid flow streams through the fluid passages 56a, 56b and 56, reducing turbulence and creating a more laminar flow through the fluid passages 56a, 56b and 56c. The helical vanes 58a, 58b and 58c operate to urge the fluid, including any entrained solid particulates, to flow upwards (as viewed in FIG. 3) through the fluid passages 56a, 56b and 56c, respectively. The helical vanes 58a, 58b and 58c facilitate the concentration of any entrained solid particulates in the fluid flow in the center of each of the fluid passages 56a, 56b and 56c, reducing the quantity of entrained solid particulates that undesirably collect or accumulate in the manifold 30 and thus do not flow into the pressure chambers 26. Additionally, the fluid liner 80 also operates to concentrate any entrained solid particulates in the fluid flow in the center of the elongated member 44, and the center of each of the fluid passages 56a, 56b and 56c, thereby further reducing the quantity of entrained solid particulates that undesirably collect or accumulate in the manifold 30 and thus do not flow into the pressure chambers 26.

In an exemplary embodiment, the thickness 80c may be greater than the thickness 80b and, during the above-described operation of the apparatus 10, the increased thickness 80c facilitates the dynamic response of the fluid liner 80 to pressure fluctuations within the internal region 72, as well as the reduction in the quantity of entrained solid particulates that collect or accumulate within the manifold 30, while maintaining the permanent bond of the fluid liner 80 to the inside surfaces 70 and 78.

During the above-described operation of the apparatus 10, the liner plugs 92 prevent entrained solid particulates from collecting or accumulating within the openings 88, 98a, 98b and 98c. In an exemplary embodiment, the liner plugs 92 may also decrease any shock waves that may be formed as a result of the presence of the bull plug assemblies 68. In an exemplary embodiment, the liner plugs 92 may be formed of a resilient material that includes one or more of the materials described or identified above in connection with the resilient material of which the fluid liner 80 may be formed, and the liner plugs 92 may dynamically respond to pressure fluctuations within the internal region 72 during fluid flow therethrough.

Before or after the above-described operation of the apparatus 10, the respective bull plug assemblies 68 that are connected to the valve lift stems 64a, 64b and 64c may be disconnected therefrom to permit access to the valves disposed in the inlet valve housings 28. More particularly, with the respective bull plug assemblies 68 disconnected, a valve lift tool may be inserted through the valve lift stems 64a, 64b and 64c and used to drain the fluid out of the chambers 26 through respective valves disposed in the inlet valve housings 28.

Before or after the above-described operation of the apparatus 10, the bull plug assembly 68 that is connected to the cleanout stem 62 may be disconnected therefrom in order to permit access to the internal region 72 so that the manifold 30 may be cleaned out as needed.

Since the fluid liner 80 is permanently bonded to the inside surfaces 70 and 78, there is no need to physically accommodate the removal of the fluid liner 80 from the manifold 30, or the insertion of the fluid liner 80 into the manifold 30. Additionally, since the fluid liner 80 is permanently bonded to the inside surfaces 70 and 78, there is no need for bracing, supports, or fasteners to maintain the position of the fluid liner 80 within the manifold 30. As a result of these factors, the size of the elongated member 44 may be decreased (e.g., the outer diameter of the elongated member 44 may be decreased), and the volume of the fluid liner 80 may be increased as compared to a manifold having a removable liner. Thus, the manifold 30 is more compact and narrow, and can fit on a truck that is adapted to haul the pump assembly 12, while providing increased pulsation control during the operation of the apparatus 10.

Figure 4C:
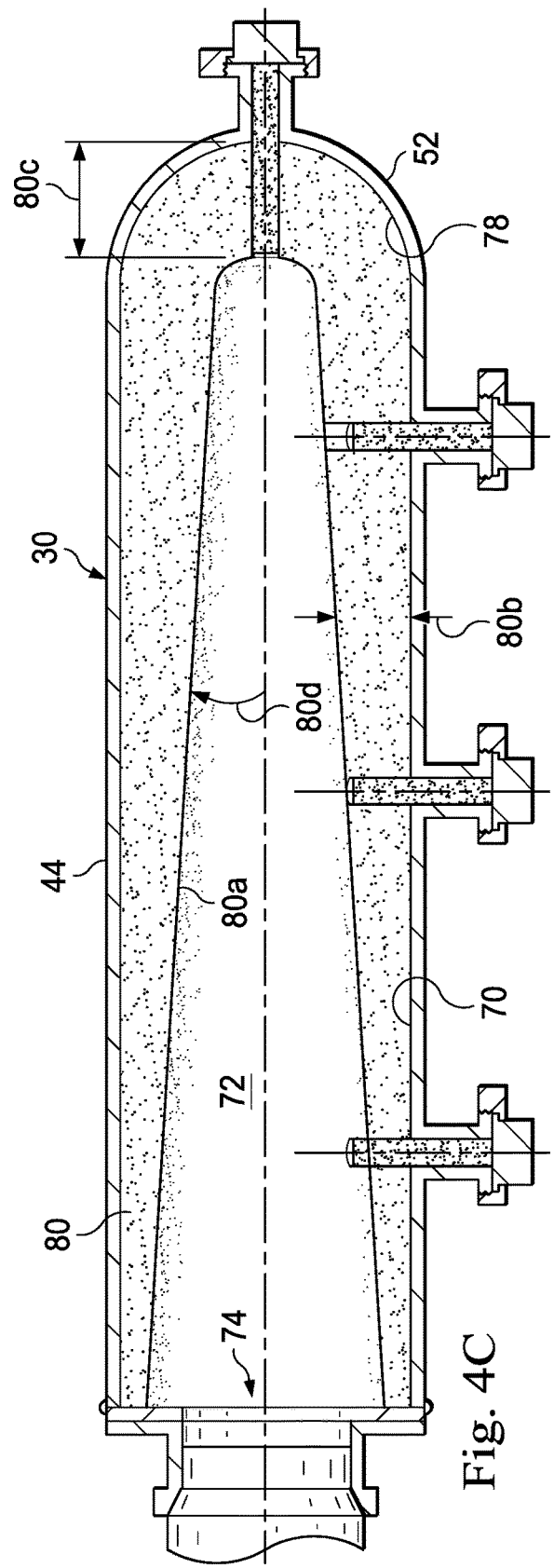
FIG. 4C is a view similar to that of FIG. 4A, according to another exemplary embodiment.

In an exemplary embodiment, as illustrated in FIG. 4C with continuing reference to FIGS. 1-4B, a longitudinally-extending taper is formed in the fluid liner 80 and defines a taper angle 80d, relative to the longitudinal axis 50. In an exemplary embodiment, the taper angle ranges from greater than 0 degrees to less than about 70 degrees measured from the longitudinal axis 50. In another exemplary embodiment the taper angle ranges from greater than 1 degree to less than 35 degrees, from about 1 degree to about 20 degrees, or from about 2 degrees to 10 degrees measured from the longitudinal axis 50. The thickness 80c is greater than the thickness 80b at any point along the elongated member 44.

During the above-described operation of the apparatus 10, in an exemplary embodiment, the taper angle 80d provides increased fluid velocity or flow to at least the outlet 76c proximate the end cap 52, as compared to a non-tapered fluid liner. The increase in velocity assists in preventing the solids from settling out of the fluid in the portion of the unit that requires the least amount of flow around end cap 52. In several exemplary embodiments, the taper angle 80d provides increased fluid volume or flow to at least the outlets 76b and 76c, as compared to a non-tapered fluid liner. In several exemplary embodiments, the taper angle 80d provides increased fluid volume or flow to the outlets 76a, 76b and 76c, as compared to a non-tapered fluid liner. In several exemplary embodiments, the taper angle 80d more evenly distributes fluid volume or flow to the outlets 76a, 76b and 76c, as compared to a non-tapered fluid liner.

During the above-described operation of the apparatus 10, in an exemplary embodiment, the thickness 80c being greater than the thickness 80b provides increased fluid volume or flow to at least the outlet 76c proximate the end cap 52, as compared to when the thicknesses 80b and 80c are equal, the thickness 80c is less than the thickness 80b, or the portion of fluid liner 80 that is permanently bonded to the inside surface 78 of the end cap 52 is omitted. During the above-described operation of the apparatus 10, in an exemplary embodiment, the thickness 80c being greater than the thickness 80b provides increased fluid volume or flow to at least the outlets 76b and 76c, as compared to when the thicknesses 80b and 80c are equal, the thickness 80c is less than the thickness 80b, or the portion of fluid liner 80 that is permanently bonded to the inside surface 78 of the end cap 52 is omitted. During the above-described operation of the apparatus 10, in an exemplary embodiment, the thickness 80c being greater than the thickness 80b provides increased fluid velocity or flow to the outlets 76a, 76b and 76c, as compared to when the thicknesses 80b and 80c are equal, the thickness 80c is less than the thickness 80b, or the portion of fluid liner 80 that is permanently bonded to the inside surface 78 of the end cap 52 is omitted. The increase in velocity assists in preventing the solids from settling out of the fluid in the portion of the unit that requires the least amount of flow around the end cap 52. During the above-described operation of the apparatus 10, in an exemplary embodiment, the thickness 80c being greater than the thickness 80b more evenly distributes fluid volume or flow between the outlets 76a, 76b and 76c, as compared to when the thicknesses 80b and 80c are equal, the thickness 80c is less than the thickness 80b, or the portion of fluid liner 80 that is permanently bonded to the inside surface 78 of the end cap 52 is omitted.

Figure 5:
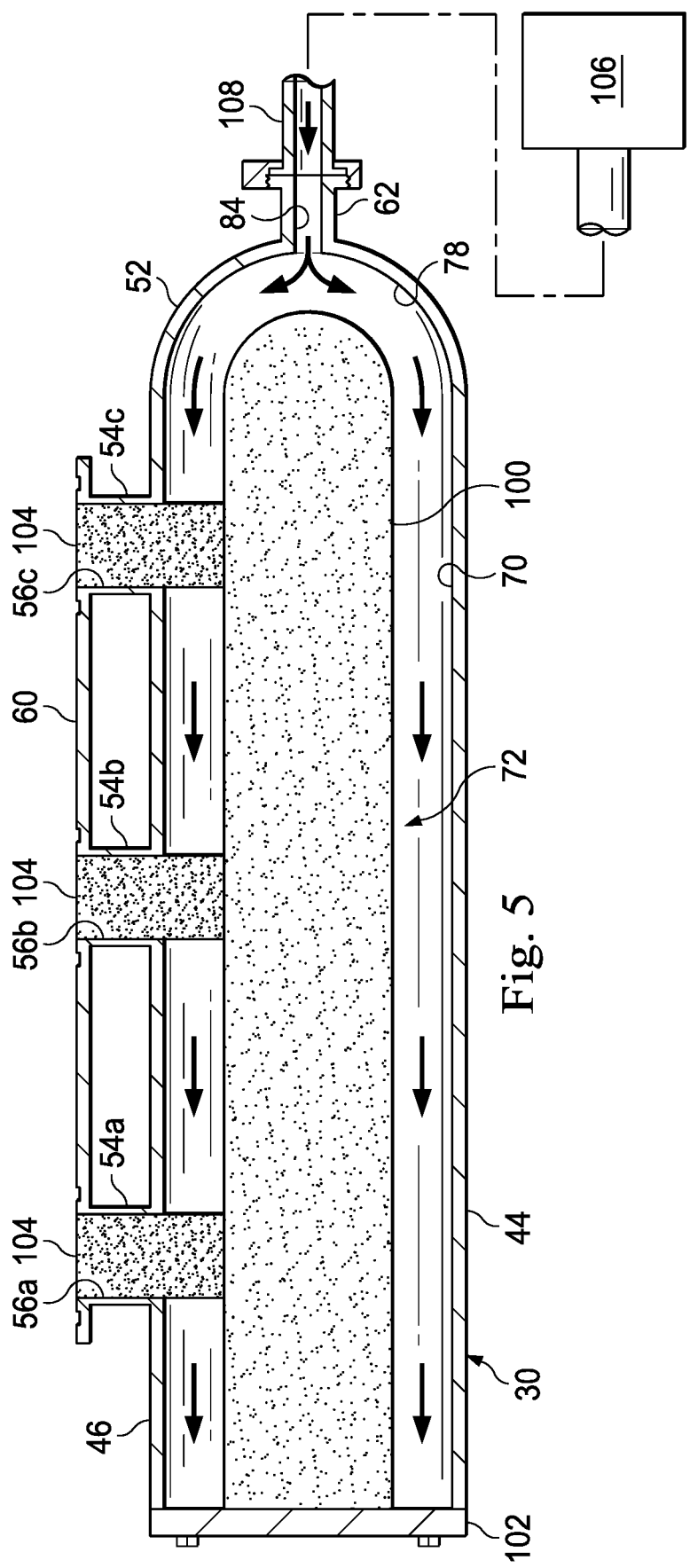
FIG. 5 is a partial sectional/partial diagrammatic view of a portion of the manifold of FIGS. 1-4B during the manufacture thereof, according to an exemplary embodiment.

As illustrated in FIG. 5 with continuing reference to FIGS. 1-4C, to manufacture the manifold 30, in an exemplary embodiment, the elongated member 44, the end cap 52, the tubes 54a, 54b and 54c, the manifold flange 60, the cleanout stem 62, and the valve lift stems 64a, 64b and 64c, are assembled in accordance with the foregoing. A generally cylindrical mold 100 is positioned within the internal region 72. The mold 100 extends from a mold end cap 102, which is connected to the elongated member 44 at the end portion 46. Respective mold plugs 104 are inserted in the fluid passages 56a, 56b and 56c and engage the mold 100. Similarly, respective mold plugs (not shown) are inserted in the openings 98a, 98b and 98c, and engage the mold 100. The mold 100 and the mold plugs 104 may be coated in a lubricant or release agent prior to the aforementioned arrangement. A pump 106 is placed in fluid communication with the internal region 72 via the passage 84 and a conduit 108, which is connected to the cleanout stem 62. In an exemplary embodiment, the mold 100 is positioned within the internal region 72 so that the mold 100 is equidistant from the inside surface 70 at all points circumferentially therearound. In an exemplary embodiment, the mold 100 is positioned within the internal region 72 so that the mold 100 is equidistant from the inside surface 70 at all points circumferentially therearound, and so that the distance between the end cap 52 and the end of the mold 100 opposite the mold end cap 102 is greater than the distance between the mold 100 and the inside surface 70. In an exemplary embodiment, the mold 100 is tapered, having a wider outer diameter at the end adjacent the mold end cap 102; the diameter of the mold 100 gradually reduces in a direction away from the mold end cap 102.

As shown in FIG. 5, to manufacture the manifold 30, in an exemplary embodiment, one or more of the above-described adhesive compounds and/or bonding agents are applied to the inside surfaces 70 and 78. Before, during or after this application, the pump 106 pumps the material that will form the fluid liner 80 into the internal region 72 via the conduit 108 and the passage 84. In an exemplary embodiment, the pumped material may be in liquid form. In an exemplary embodiment, the pumped material may be a mixture, one or more parts of which are pumped simultaneously and/or serially. In an exemplary embodiment, the pumped material includes one or more of the above-described adhesive compounds or mixtures. During the pumping of the material that will form the fluid liner 80, gas or fluid within the internal region 72 may be pushed out of the internal region 72 through vents (not shown). During or after the pumping of the material that will form the fluid liner 80, the material sets. In an exemplary embodiment, the material sets with the application of heat. In an exemplary embodiment, the material sets without the application of heat. Following the setting of the material, the mold end cap 102, the mold 100, the mold plugs 104, and any other mold plugs, are removed from the manifold 30, resulting in the fluid liner 80 illustrated in, for example, FIGS. 3, 4A and 4B, or FIG. 4C. The fluid liner 80 is permanently bonded to the inside surfaces 70 and 78. The remainder of the components of the manifold 30 that have not yet been assembled (e.g., the helical vanes 58a, 58b and 58c) are assembled in accordance with the foregoing.

Figure 6:
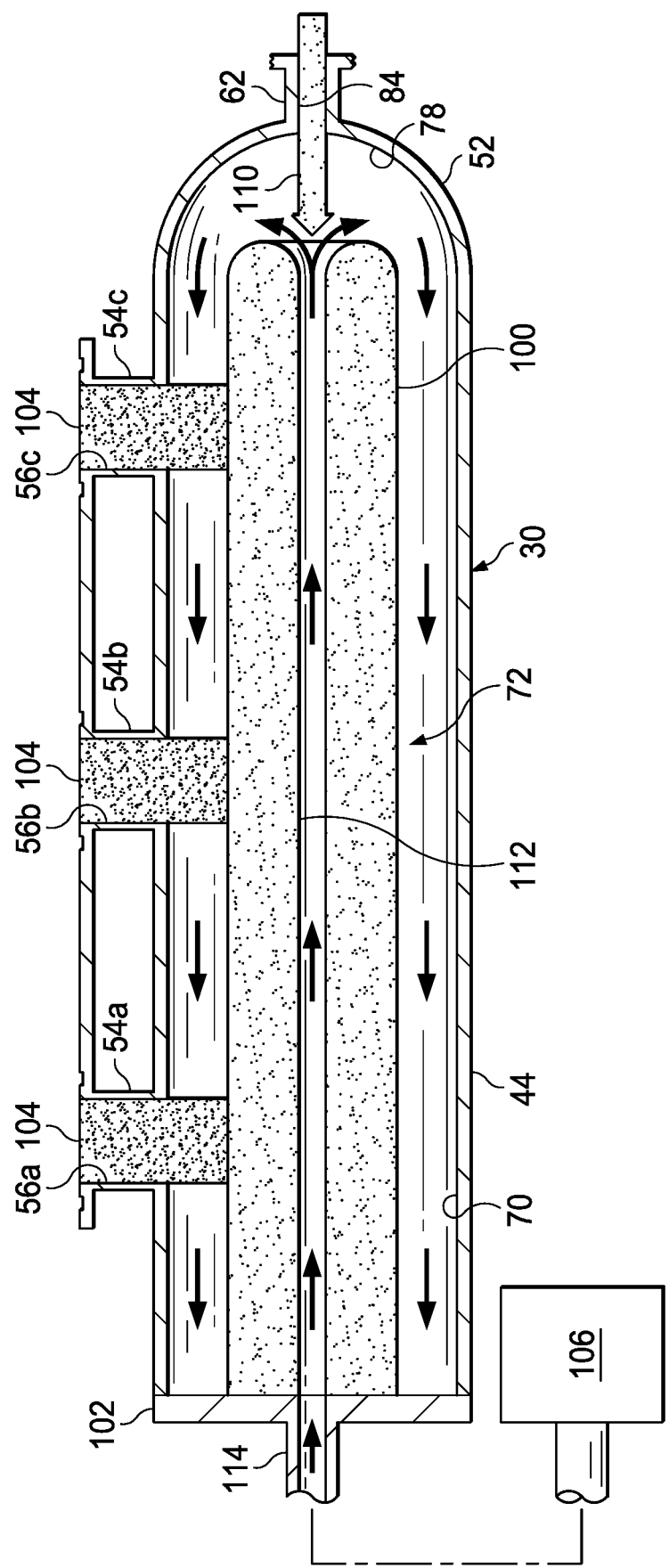
FIG. 6 is a partial sectional/partial diagrammatic view of a portion of the manifold of FIGS. 1-4B during the manufacture thereof, according to another exemplary embodiment.

As illustrated in FIG. 6 with continuing reference to FIGS. 1-5, to manufacture the manifold 30, in an exemplary embodiment, the elongated member 44, the end cap 52, the tubes 54a, 54b and 54c, the manifold flange 60, the cleanout stem 62, and the valve lift stems 64a, 64b and 64c, are assembled in accordance with the foregoing. The mold 100 is positioned within the internal region 72. The mold 100 extends from the mold end cap 102, which is connected to the elongated member 44 at the end portion 46. The mold plugs 104 are inserted in the fluid passages 56a, 56b and 56c, respectively, and engage the mold 100. Similarly, respective mold plugs (not shown) are inserted in the openings 98a, 98b and 98c, and engage the mold 100. A mold plug 110 is positioned within the passage 84. The mold plug 110 does not engage the mold 100. A longitudinally-extending passage 112 extends through the mold 100. A fluid conduit 114 is placed in fluid communication with each of the passage 112 and the pump 106. The fluid conduit 114 is connected to the mold end cap 102 at the center thereof.

As shown in FIG. 6, to manufacture the manifold 30, in an exemplary embodiment, one or more of the above-described adhesive compounds and/or bonding agents are applied to the inside surfaces 70 and 78. Before, during or after this application, the pump 106 pumps the material that will form the fluid liner 80 into the internal region 72 via the conduit 114 and the passage 112. During or after the pumping of the material that will form the fluid liner 80, the material sets. Following the setting of the material, the mold end cap 102, the mold 100, the mold plugs 104, the mold plug 110, and any other mold plugs, are removed from the manifold 30, resulting in the fluid liner 80 illustrated in, for example, FIGS. 3, 4A and 4B, or FIG. 4C. The fluid liner 80 is permanently bonded to the inside surfaces 70 and 78. The remainder of the components of the manifold 30 that have not yet been assembled (e.g., the helical vanes 58a, 58b and 58c) are assembled in accordance with the foregoing.

Figure 7:
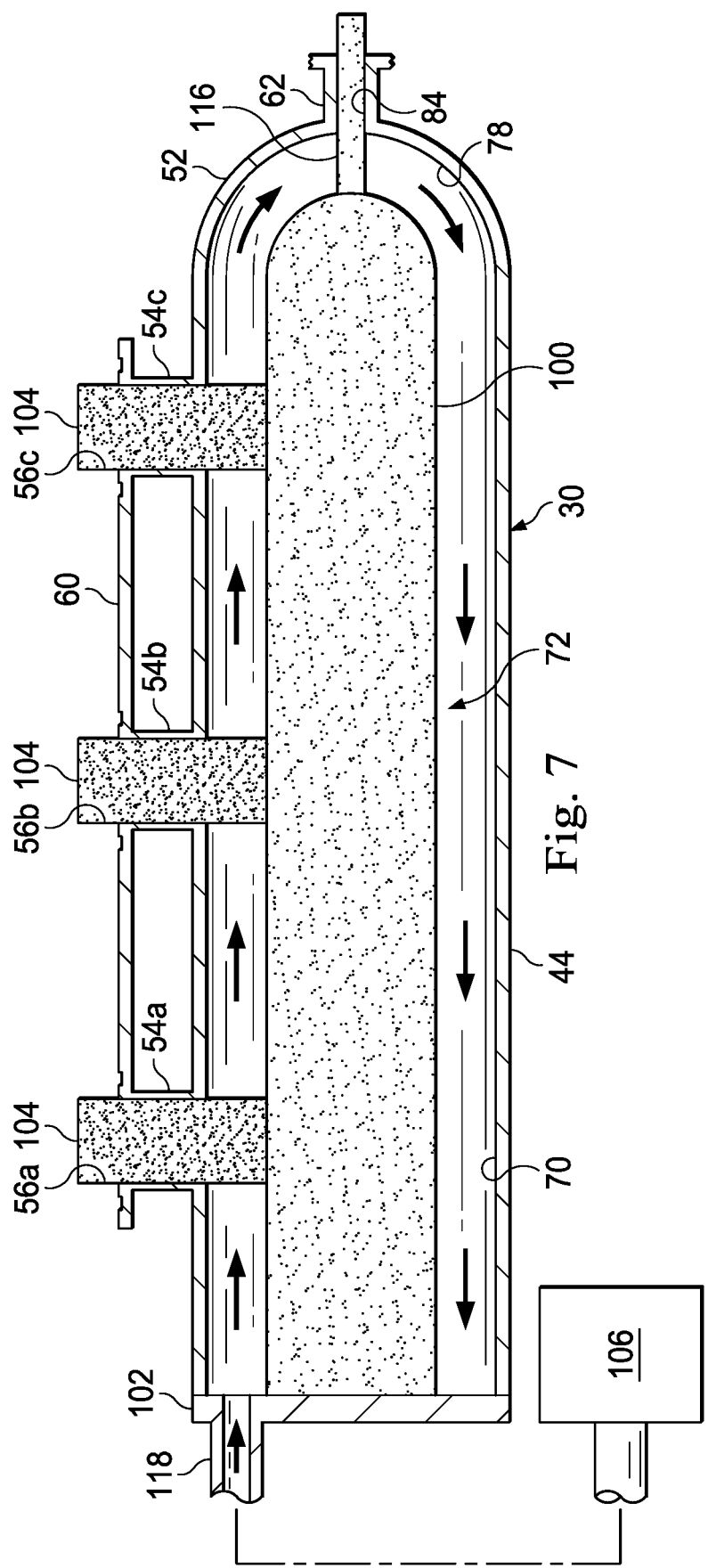
FIG. 7 is a partial sectional/partial diagrammatic view of a portion of the manifold of FIGS. 1-4B during the manufacture thereof, according to yet another exemplary embodiment.

As illustrated in FIG. 7 with continuing reference to FIGS. 1-6, to manufacture the manifold 30, in an exemplary embodiment, the elongated member 44, the end cap 52, the tubes 54a, 54b and 54c, the manifold flange 60, the cleanout stem 62, and the valve lift stems 64a, 64b and 64c, are assembled in accordance with the foregoing. The mold 100 is positioned within the internal region 72. The mold 100 extends from the mold end cap 102, which is connected to the elongated member 44 at the end portion 46. The mold plugs 104 are inserted in the fluid passages 56a, 56b and 56c, respectively, and engage the mold 100. Similarly, respective mold plugs (not shown) are inserted in the openings 98a, 98b and 98c, and engage the mold 100. A mold plug 116 is positioned within the passage 84 and engages the mold 100. A fluid conduit 118 is placed in fluid communication with each of the internal region 72 and the pump 106. The fluid conduit 118 is connected to the mold end cap 102 proximate the edge thereof.

As shown in FIG. 7, to manufacture the manifold 30, in an exemplary embodiment, one or more of the above-described adhesive compounds and/or bonding agents are applied to the inside surfaces 70 and 78. Before, during or after this application, the pump 106 pumps the material that will form the fluid liner 80 into the internal region 72 via the conduit 118. During or after the pumping of the material that will form the fluid liner 80, the material sets. Following the setting of the material, the mold end cap 102, the mold 100, the mold plugs 104, the mold plug 116, and any other mold plugs, are removed from the manifold 30, resulting in the fluid liner 80 illustrated in, for example, FIGS. 3, 4A and 4B, or FIG. 4C. The fluid liner 80 is permanently bonded to the inside surfaces 70 and 78. The remainder of the components of the manifold 30 that have not yet been assembled (e.g., the helical vanes 58a, 58b and 58c) are assembled in accordance with the foregoing.

Figure 8:
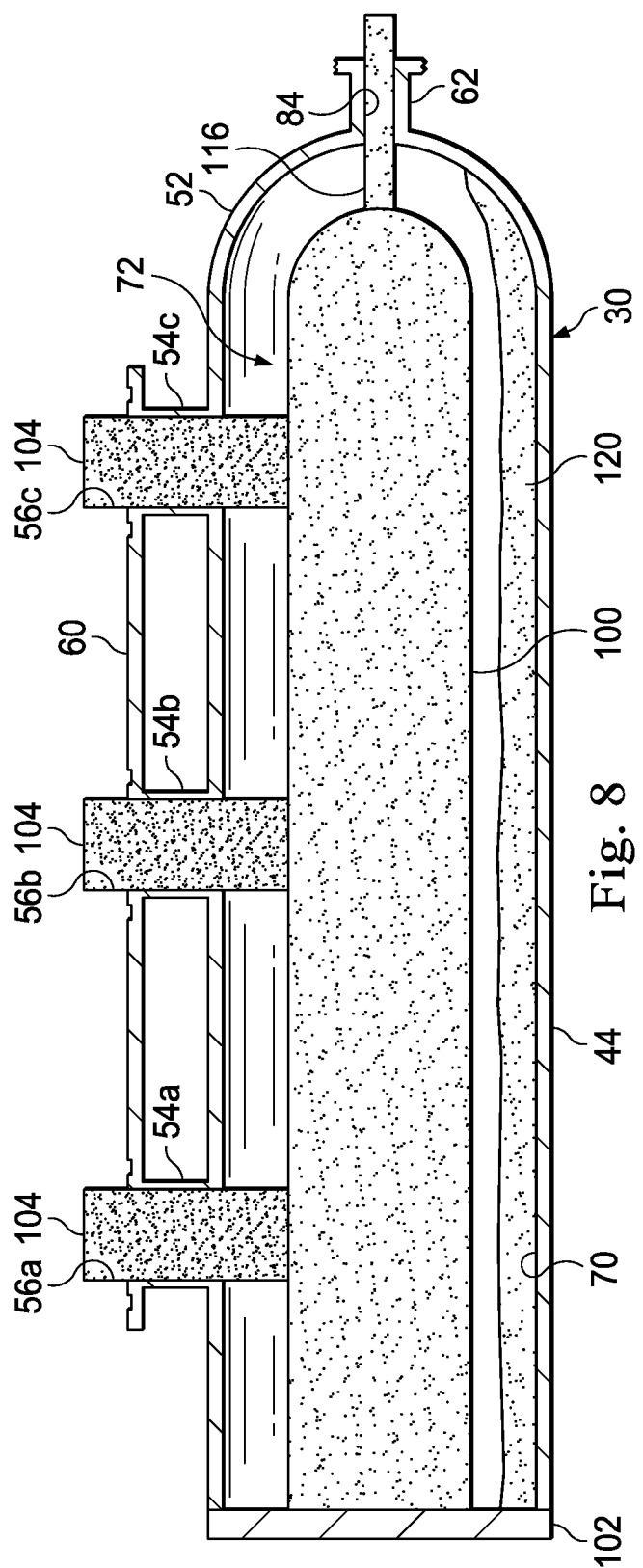
FIGS. 8 and 9 are partial sectional/partial diagrammatic views of a portion of the manifold of FIGS. 1-4B during the manufacture thereof, according to still yet another exemplary embodiment.
Figure 9:
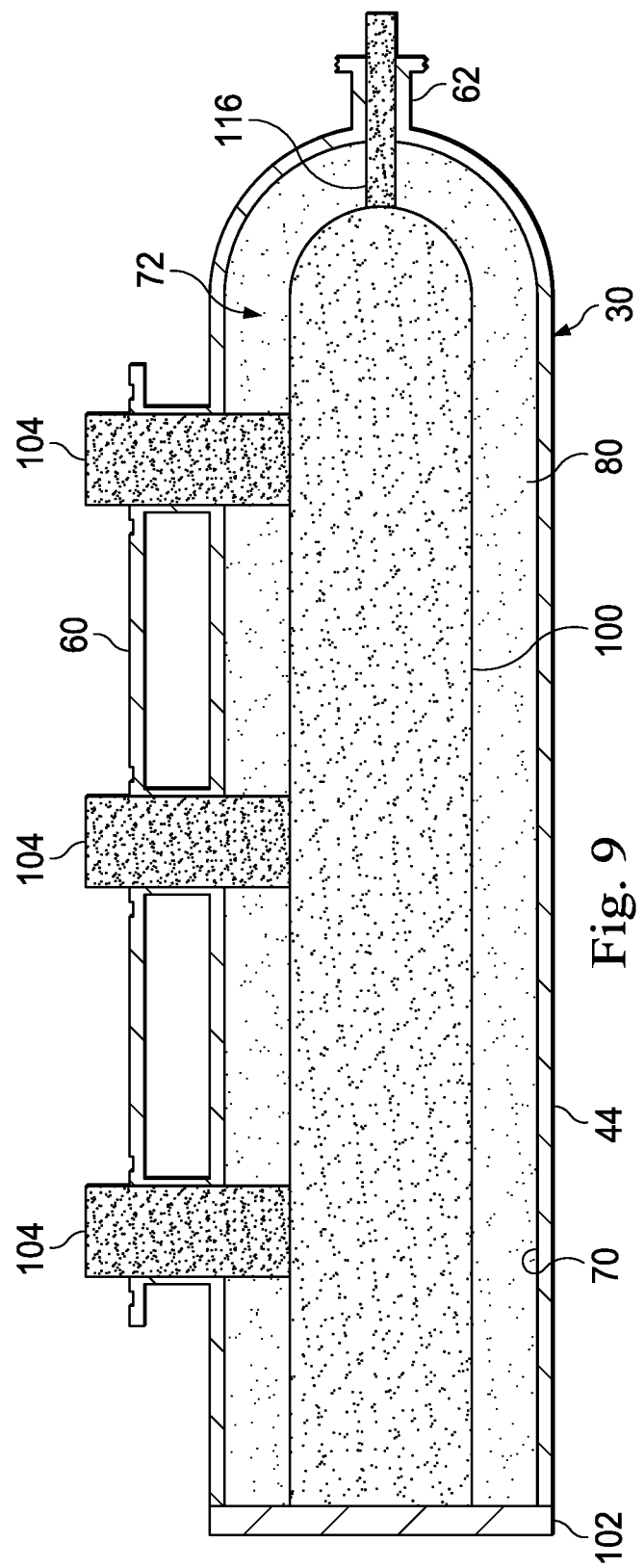

As illustrated in FIGS. 8 and 9, to manufacture the manifold 30, in an exemplary embodiment, the elongated member 44, the end cap 52, the tubes 54a, 54b and 54c, the manifold flange 60, the cleanout stem 62, and the valve lift stems 64a, 64b and 64c, are assembled in accordance with the foregoing. The mold 100 is positioned within the internal region 72. The mold 100 extends from the mold end cap 102, which is connected to the elongated member 44 at the end portion 46. The mold plugs 104 are inserted in the fluid passages 56a, 56b and 56c, respectively, and engage the mold 100. Similarly, respective mold plugs (not shown) are inserted in the openings 98a, 98b and 98c, and engage the mold 100. The mold plug 116 is positioned within the passage 84 and engages the mold 100. One or more of the above-described adhesive compounds and/or bonding agents are applied to the inside surfaces 70 and 78. Before, during or after this application, a mixture 120 is poured or otherwise disposed in the elongated member 44 of the manifold 30. In an exemplary embodiment, the mixture 120 may include a raw compound of NBR or HNBR material that is mixed with other compounds, such as a chemical blowing agent. In an exemplary embodiment, the mixture 120 may include one or more of the above-described adhesive compounds and/or bonding agents. In an exemplary embodiment, the mixture 120 may, following the mixing process, retain its liquid form for a sufficient duration to allow for pumping, extruding, or pouring of the mixture 120. As shown in FIG. 8, the mixture 120 is poured or otherwise disposed in the internal region 72. The mixture 120 is then permitted to expand to fill the portion of the internal region 72 that is not filled by, among other components, the mold 100, the mold plugs 104, the mold plug 116, and other mold plugs. As shown in FIG. 9, the mixture 120 completely fills or extrudes through the available space within the internal region 72 not occupied by other components, thereby forming the fluid liner 80. The fluid liner is permanently bonded to the inside surfaces 70 and 78.

In several exemplary embodiments, instead of, or in addition to the mixture 120, sheet(s) and/or chunk(s) of expandable material that will form the fluid liner 80 are placed or otherwise disposed in the elongated member 44; such materials may then be permitted to expand in accordance with the foregoing.

In several exemplary embodiments, the fluid liner 80 may be machined to provide the inside surface 80a (FIG. 4C) of the fluid liner 80. Following the formation of the fluid liner 80, the mold end cap 102, the mold 100, the mold plugs 104, the mold plug 116, and any other mold plugs, are removed from the manifold 30, resulting in the fluid liner 80 illustrated in, for example, FIGS. 3, 4A and 4B, or FIG. 4C. The fluid liner 80 is permanently bonded to the inside surfaces 70 and 78. The remainder of the components of the manifold 30 that have not yet been assembled (e.g., the helical vanes 58a, 58b and 58c) are assembled in accordance with the foregoing.

Figure 10:
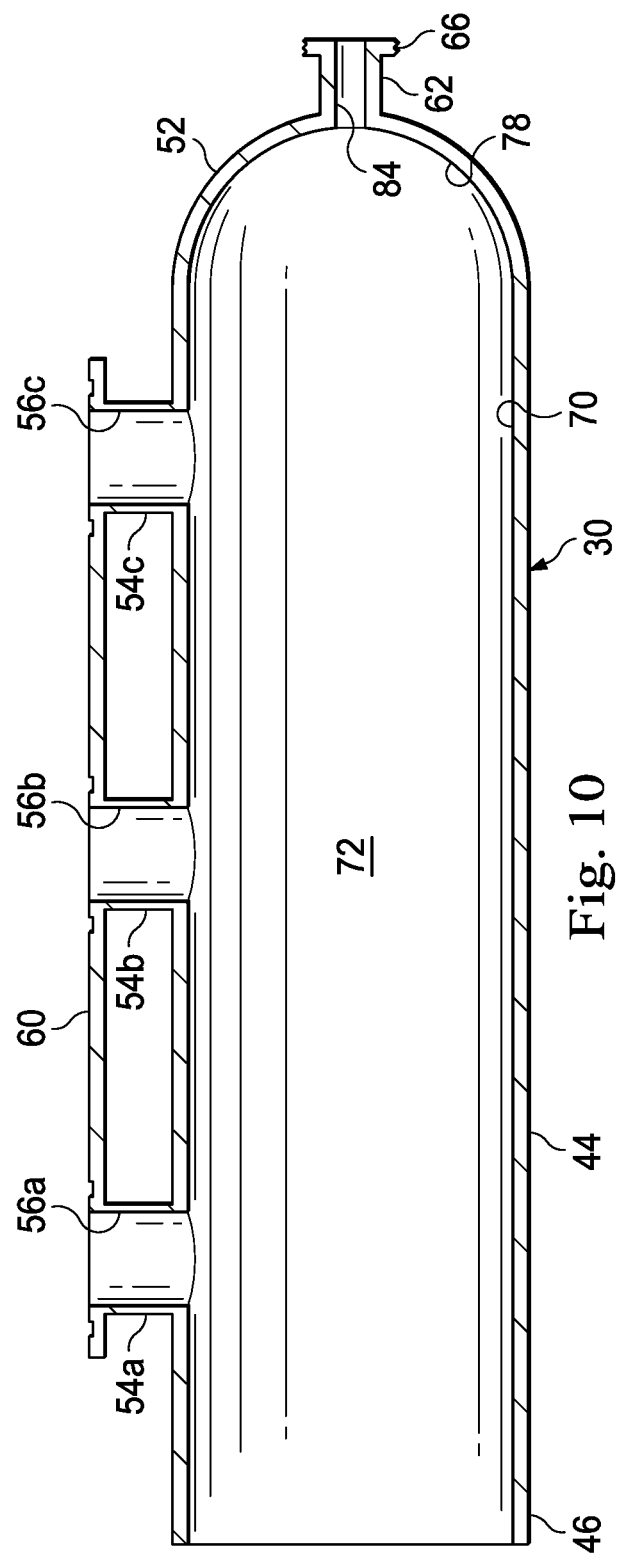
Figure 11A:
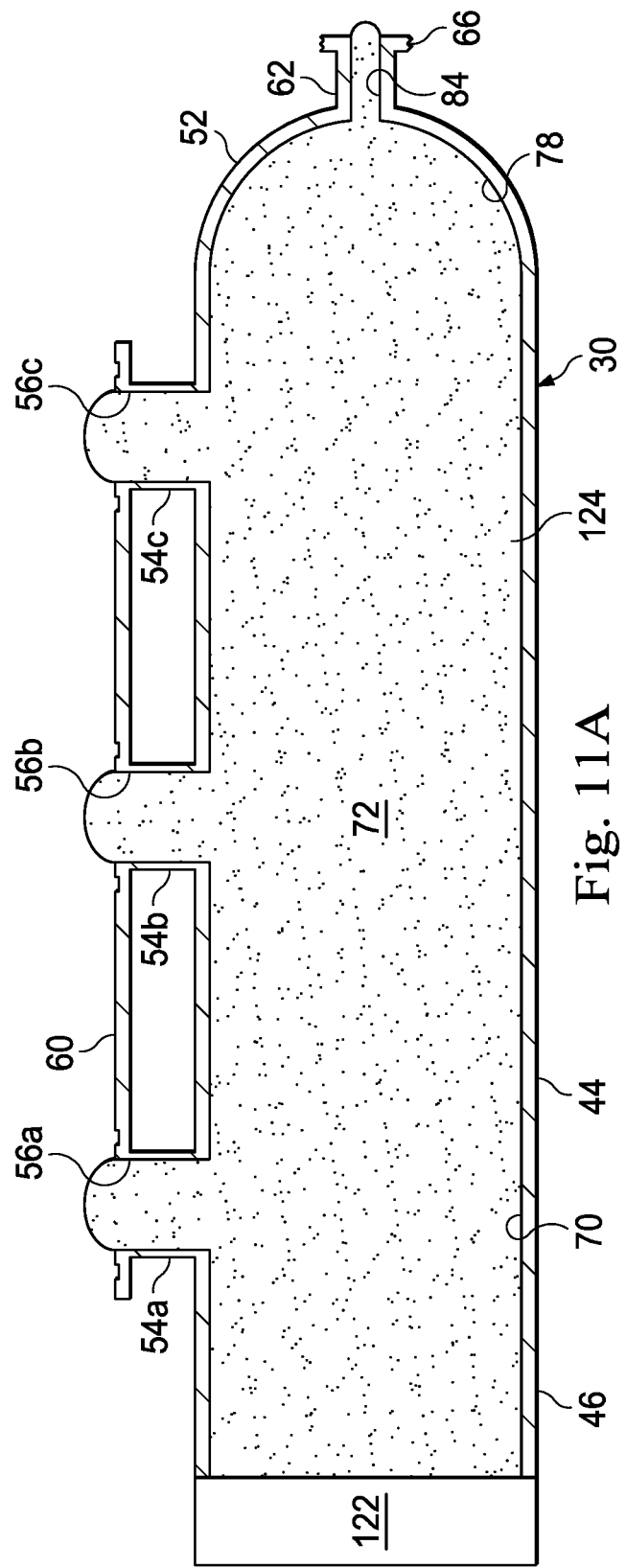

As illustrated in FIGS. 10, 11A and 11B with continuing reference to FIGS. 1-9, to manufacture the manifold 30, in an exemplary embodiment, the elongated member 44, the end cap 52, the tubes 54a, 54b and 54c, the manifold flange 60, the cleanout stem 62, and the valve lift stems 64a, 64b and 64c, are assembled in accordance with the foregoing, as shown in FIG. 10.

As shown in FIG. 11A, a pump 122 is placed in fluid communication with the internal region 72. In an exemplary embodiment, the pump 122 may be operably coupled to the elongated member 44 at the end portion 46. To manufacture the manifold 30, the pump 122 pumps, draws, extrudes or otherwise forces material 124 into the internal region 72, causing the material 124 to fill the internal region 72, the fluid passages 56a, 56b, and 56c, the passage 84, and the passages 94a, 94b and 94c (shown in FIG. 4A). In an exemplary embodiment, the material 124 includes blowing agents, any of the above-described materials that may form the fluid liner 80, any of the above-described adhesive compounds and/or bonding agents, and/or any combination thereof. The material 124 is permitted to set, cure or solidify in the internal region 72 so that the material 124 permanently bonds to the inside surfaces 70 and 78. In an exemplary embodiment, the material 124 is set with the application of heat. In an exemplary embodiment, the material 124 is set without the application of heat. After the setting of the material 124, the material is permanently bonded to the inside surfaces 70 and 78. In an exemplary embodiment, before, during or after the filling of the internal region 72, any of the above-described adhesive compounds and/or bonding agents may be applied against the inside surfaces 70 and 78.

As shown in FIG. 11B, during or after the setting of the material 124, a tool 126, such as a drill bit, may be used to remove a portion of the material 124 from the internal region 72. The tool 126 may be moved in a direction A and then in a direction opposite thereto. A tool 128, such as a drill bit, may be used to remove respective portions of the material 124 from the fluid passages 56a, 56b and 56c. The tool 128 may be moved in a direction B and then in a direction opposite thereto. A tool 130, such as a drill bit, may be used to remove a portion of the material 124 from the passage 84. The tool 130 may be moved in a direction C and then in a direction opposite thereto. In a similar manner, respective portions of the material 124 may be removed from the openings 94a, 94b and 94c (shown in FIG. 4A).

Additionally, the tool 128 may be used to form the openings 82a, 82b and 82c (shown in FIG. 3). The tool 130 may be used to form the opening 86 (shown in FIG. 3). Additionally, the tool used to remove respective portions of the material 124 from the openings 94a, 94b and 94c, may be used to form the openings 98a, 98b and 98c (shown in FIG. 4A). In several exemplary embodiments, the tools 126, 128 and 130, and/or other tools, may be used to form the fluid liner 80 illustrated in, for example, FIGS. 3, 4A and 4B, or FIG. 4C. The remainder of the components of the manifold 30 that have not yet been assembled (e.g., the helical vanes 58a, 58b and 58c) are assembled in accordance with the foregoing.

Figure 12B:
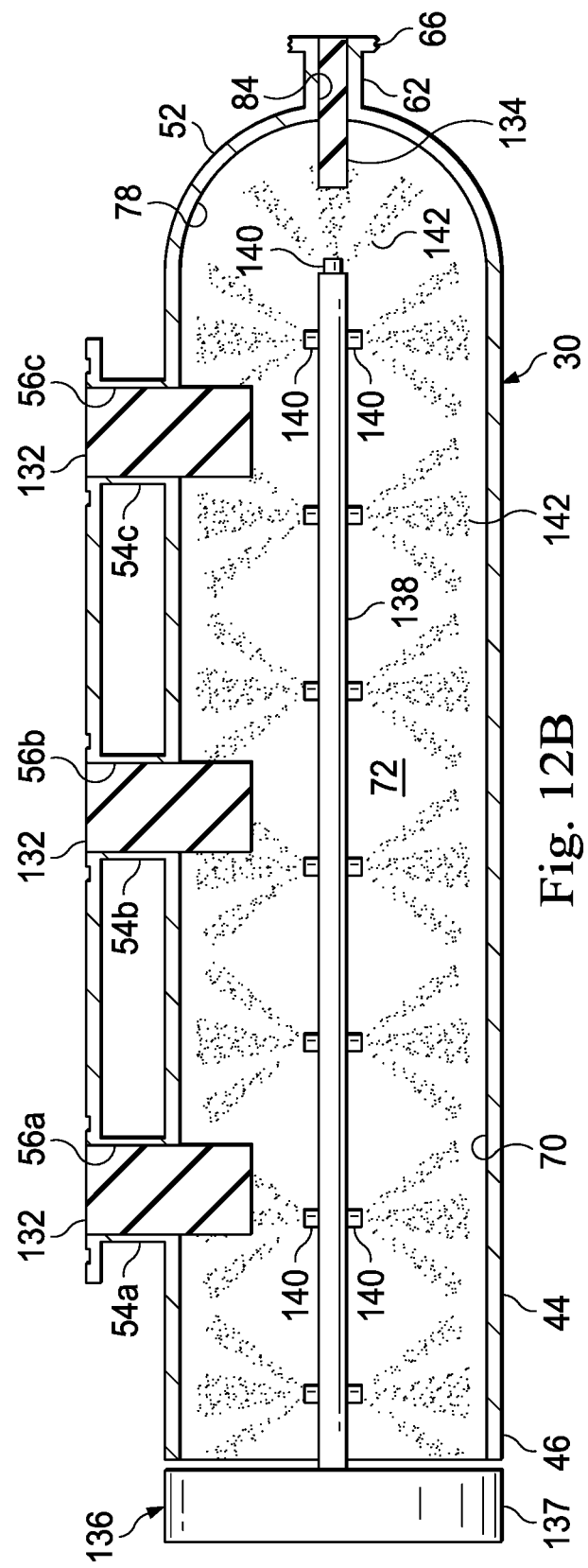

As illustrated in FIGS. 12A, 12B, 12C and 12D with continuing reference to FIGS. 1-11B, to manufacture the manifold 30, in an exemplary embodiment, the elongated member 44, the end cap 52, the tubes 54a, 54b and 54c, the manifold flange 60, the cleanout stem 62, and the valve lift stems 64a, 64b and 64c, are assembled in accordance with the foregoing, as shown in FIG. 12A. Respective mold plugs 132 are inserted in the fluid passages 56a, 56b and 56c. The respective lengths of the mold plugs 132 are equal to at least the sum of the length of the fluid passage 56a and the length of the opening 82a, at least the sum of the length of the fluid passage 56b and the length of the opening 82b, and at least the sum of the length of the fluid passage 56*c* and the length of the opening 82*c*. A mold plug 134 is inserted in the passage 84. The length of the mold plug 134 is equal to at least the sum of the passage 84 and the opening 88. Respective mold plugs (not shown) are inserted in the passages 94*a*, 94*b* and 94*c* (not shown); the respective lengths of such mold plugs are equal to at least the sum of the length of the passage 94*a* and the length of the opening 98*a*, at least the sum of the length of the passage 94*b* and the length of the opening 98*b*, and at least the sum of the length of the passage 94*c* and the length of the opening 98*c*.

As shown in FIG. 12B, an application device 136 is provided that includes a base 137, a tubular member 138 extending from the base 137, and plurality of nozzles 140 connected to the tubular member 138. The nozzles 140 are spaced both axially along the tubular member 138, and circumferentially around the tubular member 138. At least one of the nozzles 140 is positioned at the distal end of the tubular member 138. The tubular member 138 is inserted into the elongated member 44 from the end portion 46. The application device 136 is activated to apply one or more layers of material 142 against the inside surfaces 70 and 78. The material 142 flows through the tubular member 138 and out of the nozzles 140, spraying into the internal region 72. As a result, the material 142 is applied against the inside surface 70 and 78. In an exemplary embodiment, the material 142 includes blowing agents, any of the above-described materials that may form the fluid liner 80, any of the above-described adhesive compounds and/or bonding agents, and/or any combination thereof. In an exemplary embodiment, during the application of the material 142, the tubular member 138 may be moved left and/or right, as viewed in FIG. 12B, the tubular member 138 may be rotated about the longitudinal axis 50, and/or any combination thereof. In an exemplary embodiment, before, during or after the spraying of the material 142, any of the above-described adhesive compounds and/or bonding agents may be applied against the inside surfaces 70 and 78.

Figure 12C:
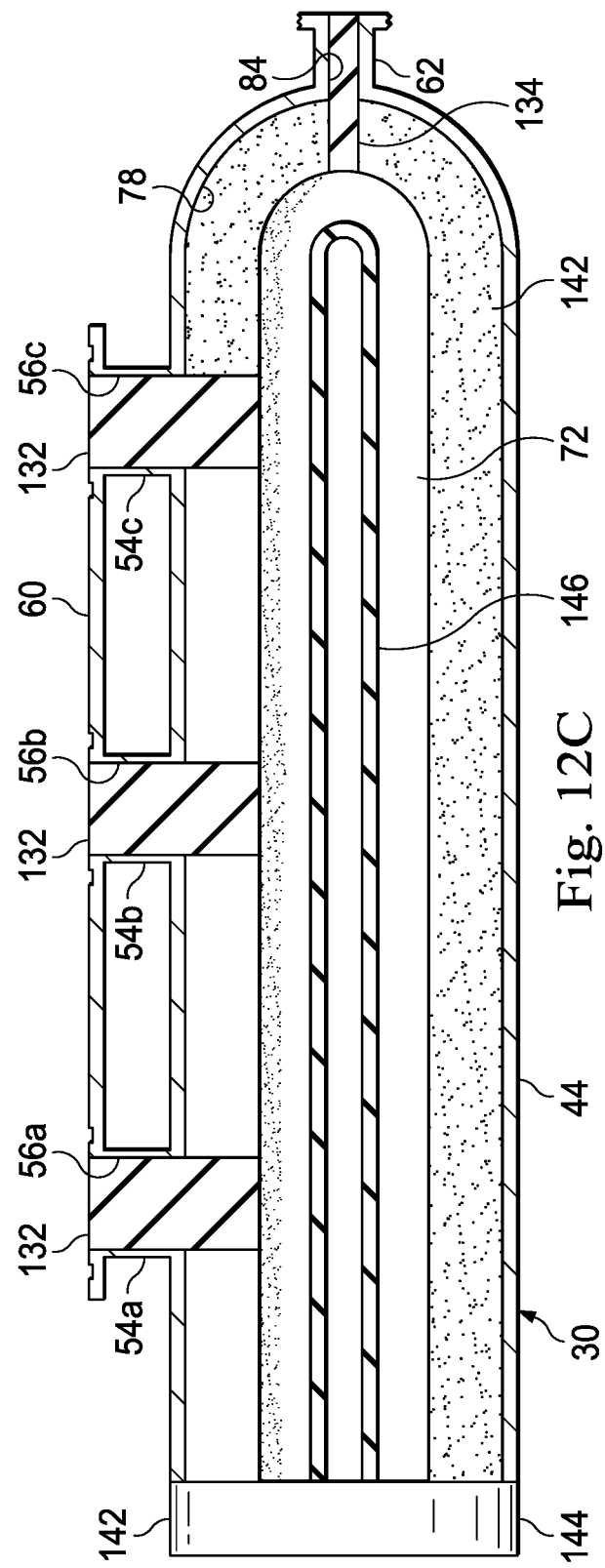
FIGS. 12C and 12D are partial sectional/partial diagrammatic views of a portion of the manifold of FIGS. 1-4B during the manufacture thereof, according to still yet another exemplary embodiment.

As shown in FIG. 12C, the tubular member 138 is removed from the internal region 72. A setting device 142 is provided that includes a base 144 and an expandable member 146 extending therefrom. In several exemplary embodiments, the expandable member 146 includes an expandable mandrel or other mechanical expansion device, an air-expandable or inflatable device such as a balloon, one or more other types of expandable members, or any combination thereof. The expandable member 146 is inserted into the internal region 72.

Figure 12D:
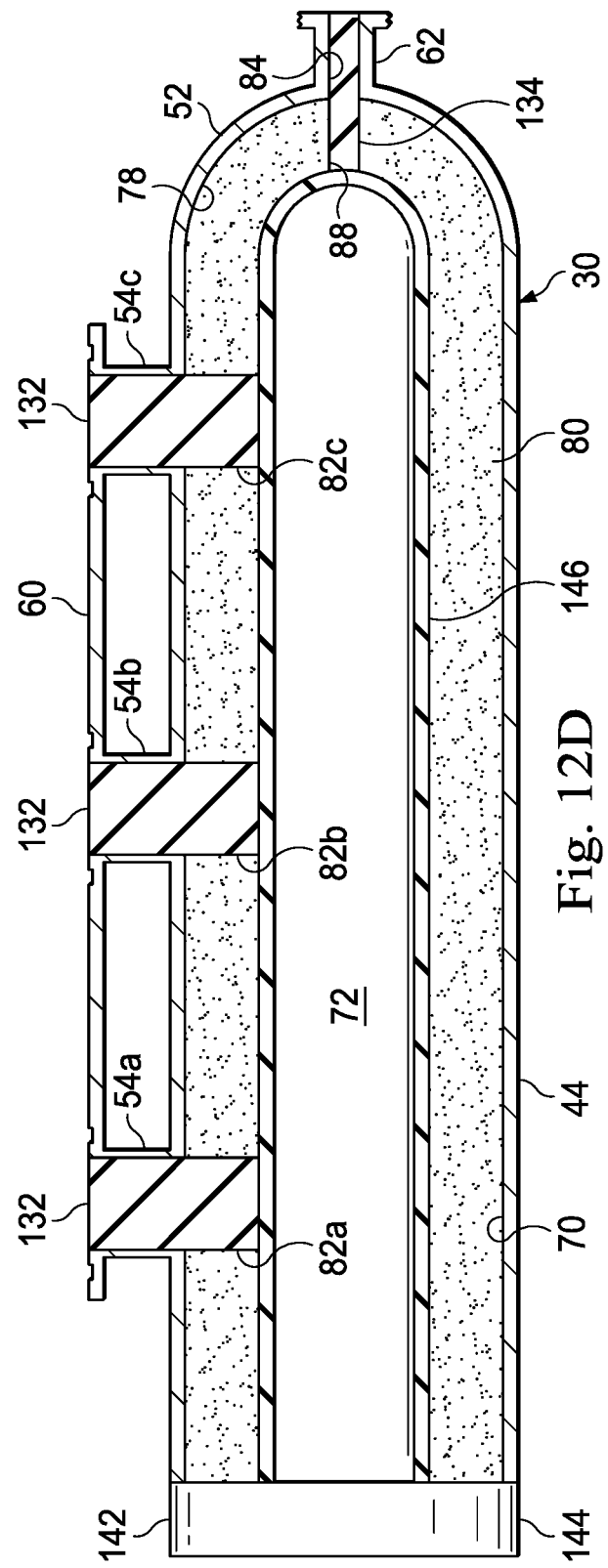

As shown in FIG. 12D, the expandable member 146 is operated to expand into engagement with the material 142 so that the material 142 is held in place between the expandable member 146 and the inside surfaces 70 and 78. The expandable member 146 may be held in its expanded state until the material 142 has sufficiently set and permanently bonded to the inside surfaces 70 and 78, thereby forming the fluid liner 80. Following the formation of the fluid liner 80, the expandable member 146 is then removed from the internal region 72. The mold plugs 132, the mold plug 134, and any other mold plugs, are removed from the manifold 30, resulting in the fluid liner 80 illustrated in, for example, FIGS. 3, 4A and 4B, or FIG. 4C. The fluid liner 80 is permanently bonded to the inside surfaces 70 and 78. The remainder of the components of the manifold 30 that have not yet been assembled (e.g., the helical vanes 58*a*, 58*b* and 58*c*) are assembled in accordance with the foregoing.

Figure 13:
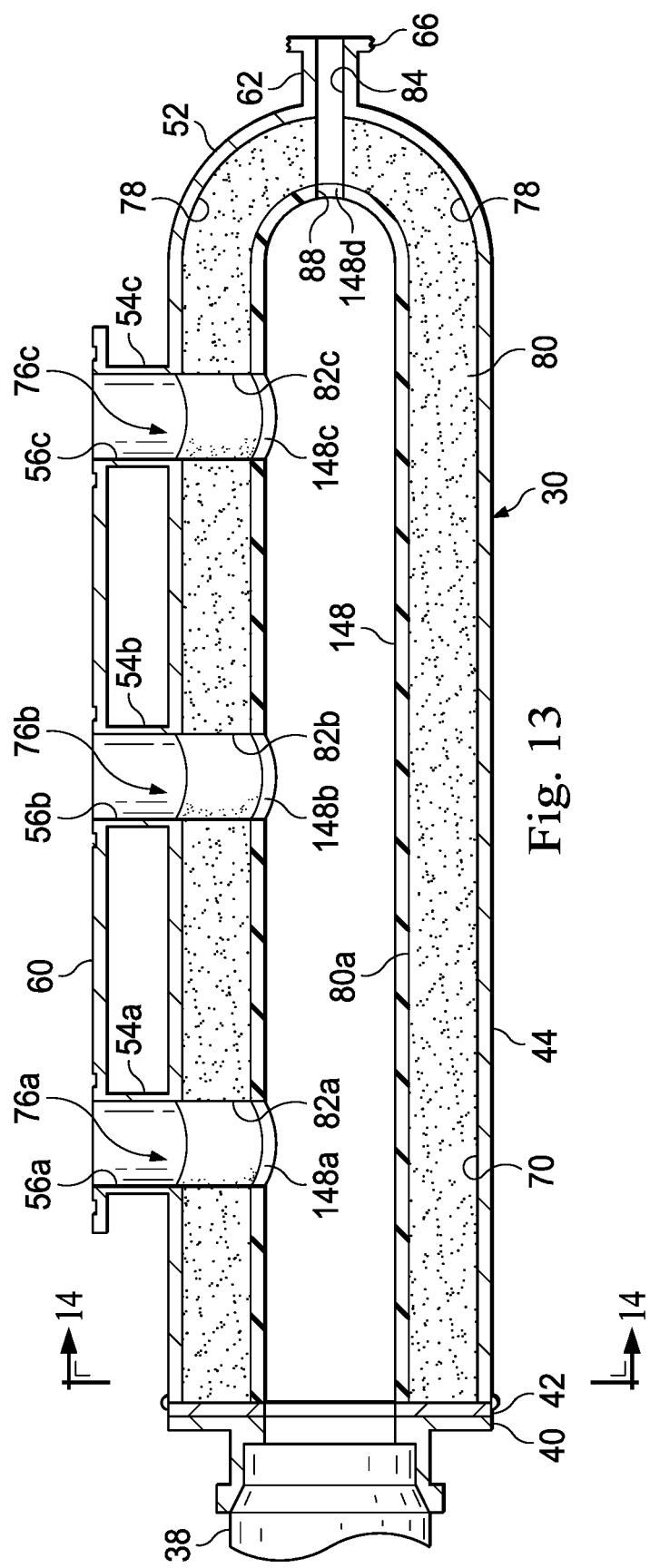
FIG. 13 is a view similar to that of FIG. 3, according to another exemplary embodiment.

In an exemplary embodiment, as illustrated in FIG. 13 with continuing reference to FIGS. 1-12D, a surface liner 148 is bonded to the inside surface 80*a* of the fluid liner 80. The surface liner 148 is adapted to protect the fluid liner 80. In an exemplary embodiment, the surface liner 148 may be formed of a material that includes, for example, ethylene-propylene, fluorocarbon, silicone, fluorosilicone, acrylics, polyurethanes, natural rubbers, acrylonitrile, butadiene, polyisoprene, polybutadiene, chloroprene, butyl rubber, nitrile rubber, other materials, other material types, or any combination thereof.

In several exemplary embodiments, the surface liner 148 may be bonded to the inside surface 80*a* during one or more of the above-described methods to manufacture the manifold 30. In an exemplary embodiment, the surface liner 148 may be connected to the mold 100 in any of the exemplary embodiments illustrated in FIG. 5, 6, 7, or 8 and 9. In an exemplary embodiment, the surface liner 148 may include cut-out sections 148*a*, 148*b* and 148*c* to accommodate the respective mold plugs 104, a cut-out section 148*d* to accommodate the mold plug 116, and cut-out sections to accommodate other mold plugs and features. In an exemplary embodiment, the mold 100 may include a material or coating that prevents the surface liner 148 from sticking to the mold 100, and/or the surface liner 148 may include a bonding agent such that the surface liner 148 bonds to the fluid liner 80 during the formation thereof.

In an exemplary embodiment, the surface liner 148 may be connected to the expandable member 146 in the embodiment illustrated in FIGS. 12C and 12D. As a result, the surface liner 148 engages the material 142 during the expansion of the expandable member 146 and its engagement with the material 142. In an exemplary embodiment, the expandable member 146 may include a material or a coating that prevents the surface liner 148 from sticking to the expandable member 146, and/or the surface liner 148 may include a bonding agent such that the surface liner 148 attaches to the material 142 upon the setting of the material 142 and thus the formation of the fluid liner 80.

Figure 14:
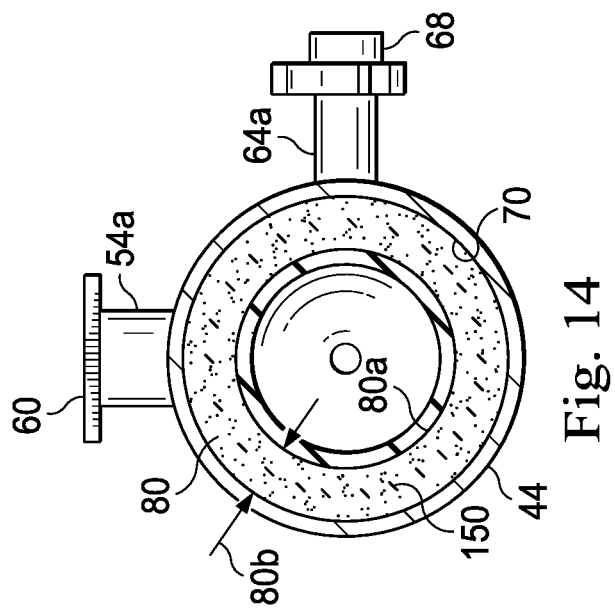
FIG. 14 is a sectional view taken along line 14-14 of FIG. 3, according to an exemplary embodiment.

In an exemplary embodiment, as illustrated in FIG. 14 with continuing reference to FIGS. 1-13, the fluid liner 80 includes reinforcement members 150. The reinforcement members 150 may be in the form of reinforcement materials, mechanical supports, or any combination thereof. Reinforcement materials may include metal materials, plastic materials, fiber materials, other materials, or any combination thereof. Mechanical supports may include surface supports, scaffolding, webbing, other supports, other stabilizers, or any combination thereof. The reinforcement members 150 may be part of the material used to form the fluid liner 80 in accordance with the above-described embodiments, and/or may be assembled with, for example, the elongated member 44 and/or the end cap 52, before the fluid liner 80 is formed.

Figure 15:
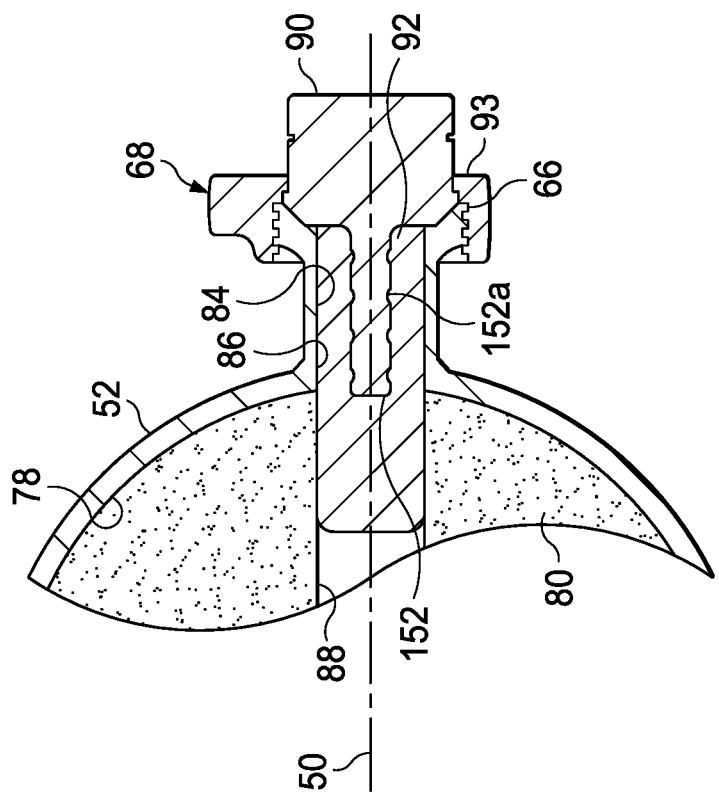
FIG. 15 is an enlarged view of a portion of FIG. 3, according to another exemplary embodiment.

In an exemplary embodiment, as illustrated in FIG. 15 with continuing reference to FIGS. 1-14, each of the bull plug assemblies 68 includes a post 152 that extends from the head 90 and into the liner plug 92, facilitating the connection between the head 90 and the liner plug 92 and strengthening the bull plug assembly 68. The post 152 includes a plurality of undercuts 152*a*.

In several exemplary embodiments, instead of, in addition to, or during, one or more of the above-described methods to manufacture the manifold 30, the fluid liner 80, or the gas and/or liquid material that forms the fluid liner 80, may be extruded, poured, or otherwise disposed in the manifold 30. The manifold 30 may then be spun so that the material undergoes a centrifugal rubber mold casting (CRMC) process to thereby form the fluid liner 80. In an exemplary embodiment, the fluid liner 80, or the gas and/or liquid material(s) that form(s) the fluid liner 80, may be extruded, poured, or otherwise disposed in at least the elongated member 44. At least the elongated member 44 may then be spun so that the material undergoes a CRMC process to thereby form the fluid liner 80. The remaining components of the manifold 30 may then be assembled to at least the elongated member 44 and the end cap 52, and additional fabrication may occur, in accordance with the foregoing description of the manifold 30. In several exemplary embodiments, during the CRMC process, any openings in the elongated member 44, other components of the manifold 30, or any combination thereof, may be sealed using the above-described mold plugs or variations thereof, tape, plastic sheeting, or any combination thereof.

In several exemplary embodiments, the fluid liner 80 is formed from a sheet or chunks of an expanding material disposed in the internal region 72. The sheet or chunks can be cut or positioned so as not to block any of the above-described openings in the manifold 30. The sheet or chunks of expanding material can be cured or expanded under conditions such as, but not limited to, the application of heat and/or a vacuum to the internal region 72.

The foregoing exemplary embodiments are described in terms of a reciprocating pump that may be used in different environments and application such as, for example, a mud pump or a frac pump. However, the foregoing exemplary embodiments are not limited to reciprocating pumps as other structures requiring the dampening of the vibrations of fluid flow may benefit from the disclosed embodiments. For example and not limitation, the embodiments described herein may be adapted to dampen the vibration of fluid flow in other types of pumps, centrifugal pumps, plenum chambers, baffles, scrubbers, pipes, automobiles, ships, or other equipment when dampening of solids, liquids, gels, or gasses is needed.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "left" and right", "front" and "rear", "above" and "below" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

In addition, the foregoing describes only some embodiments of the invention(s), and alterations, modifications, additions and/or changes can be made thereto without departing from the scope and spirit of the disclosed embodiments, the embodiments being illustrative and not restrictive.

Furthermore, invention(s) have described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention(s). Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. A method of manufacturing a manifold through which fluid is adapted to flow, the method comprising:
   providing an elongated member extending longitudinally and defining an internal region through which the fluid is adapted to flow, the elongated member comprising an inlet via which the fluid flows into the internal region and first and second outlets via which the fluid flows out of the internal region, the first and second outlets defining first and second curved surfaces, respectively, of the elongated member;
   disposing a fluid liner within the internal region;
   bonding the fluid liner to an inside surface of the elongated member so that the fluid liner is permanently bonded to and in contact with the inside surface of the elongated member;
   removing a portion of the fluid liner bonded to the inside surface of the elongated member to form a first opening and a second opening aligned with the first and second outlets, respectively, the first and second openings defining third and fourth curved surfaces, respectively, of the fluid liner, the third and fourth curved surfaces being flush with the first and second curved surfaces, respectively, of the elongated member;
   wherein the first and second openings are spaced from each other so that a portion of the fluid liner, including at least respective portions of the first and second surfaces, extends longitudinally between the first and second openings.

2. The method of claim 1, further comprising extending first and second longitudinally-spaced tubes from the elongated member, the first and second tubes defining first and second fluid passages, respectively, wherein the first and second fluid passages are generally aligned with the first and second outlets, respectively, and thus with the first and second openings, respectively, so that each of the first and second fluid passages are in fluid communication with the internal region.

3. The method of claim 2, further comprising disposing first and second helical vanes in the first and second passages, respectively, wherein the first and second helical vanes are adapted to induce vortices in fluid flow through the first and second fluid passages, respectively.

4. The method of claim 1, further comprising forming a third opening in the fluid liner and extending a first liner plug within the third opening.

5. The method of claim 4, further comprising extending a first stem from the elongated member and connecting a first bull plug assembly to the first stem, the first bull plug assembly comprising the first liner plug and a first head from which the first liner plug extends, wherein the first liner plug extends within the third opening in response to connecting the first bull plug assembly to the first stem.

6. The method of claim 5, wherein the first bull plug assembly further comprises a first post extending from the head and into the first liner plug.

7. The method of claim 4, further comprising forming a fourth opening in the first liner and extending a second liner plug within the fourth opening.

8. The method of claim 1, wherein the manifold is adapted to be connected to a fluid cylinder of a reciprocating pump.

* * * * *